(12) United States Patent
Bassi

(10) Patent No.: US 9,998,659 B2
(45) Date of Patent: Jun. 12, 2018

(54) METHOD AND SYSTEM FOR ADAPTIVE PERSPECTIVE CORRECTION OF ULTRA WIDE-ANGLE LENS IMAGES

(75) Inventor: Zorawar Singh Bassi, Markham (CA)

(73) Assignee: GEO SEMICONDUCTOR INC., San Jose, CA (US)

(*) Notice: Subject to any disclaimer, the term of this patent is extended or adjusted under 35 U.S.C. 154(b) by 114 days.

(21) Appl. No.: 13/808,464

(22) PCT Filed: Mar. 1, 2012

(86) PCT No.: PCT/US2012/027189
§ 371 (c)(1),
(2), (4) Date: Sep. 13, 2013

(87) PCT Pub. No.: WO2013/130082
PCT Pub. Date: Sep. 6, 2013

(65) Prior Publication Data
US 2014/0368606 A1     Dec. 18, 2014

(51) Int. Cl.
*H04N 5/232*     (2006.01)
*H04N 13/04*    (2006.01)
*G06T 3/00*      (2006.01)

(52) U.S. Cl.
CPC ....... *H04N 5/23238* (2013.01); *G06T 3/0062* (2013.01); *H04N 13/0404* (2013.01)

(58) Field of Classification Search
CPC ............ H04N 5/23238; H04N 13/0404; G06T 3/0062

USPC .......................................................... 348/36
See application file for complete search history.

(56) References Cited

U.S. PATENT DOCUMENTS

| 6,754,379 B2 | 6/2004 | Xiong et al. |
| 2008/0150956 A1 | 6/2008 | Maeiwa et al. |
| 2011/0069160 A1 | 3/2011 | Ning |
| 2012/0098926 A1 | 4/2012 | Kweon |

FOREIGN PATENT DOCUMENTS

WO       2011005024 A2     1/2011

OTHER PUBLICATIONS

Supplementary European Search Report, completed Nov. 30, 2015, issued in corresponding EP Application No. 12870125.7, 8 pages.
Robert Carroll et al., "Optimizing Content-Preserving Projections for Wide-Angle Images", ACM Transactions on Graphics (Proceedings of SIGGraph 2009), 2009, pp. 43:1-43:9, 28(3).
International Search Report for PCT/US2012/027189 dated May 30, 2012.

*Primary Examiner* — Gims Philippe
*Assistant Examiner* — Mainul Hasan
(74) *Attorney, Agent, or Firm* — Sughrue Mion, PLLC

(57) ABSTRACT

Methods for correcting an image acquired through an Ultra Wide-Angle (UWA) lens is disclosed, where the entire image is mapped via a transformation that substantially improves the perspective, yet maintains all image information. Additional locally adaptive transformations can be applied to regions of interest in the image to fully restore the perspective. This de-warping scheme allows for flexible manipulation of the image while no content would be lost.

25 Claims, 34 Drawing Sheets

METHOD AND SYSTEM FOR ADAPTIVE PERSPECTIVE CORRECTION OF ULTRA WIDE-ANGLE LENS IMAGES

FIELD

The embodiments described herein relate generally to electronic image and video processing, and particularly to correcting images severely distorted by wide-angle lenses.

BACKGROUND

Wide-angle lenses are commonly used in cameras amongst other image and video capture devices where a large viewing angle is required or preferred. There also exist so-called Ultra Wide-Angle (UWA) lenses, with Field of Views (FOV) of up to or even larger than 180°. A fisheye lens is an exemplary UWA that may cover up to 180° ($2\pi$ steradians) of angular FOV. As such, having two fisheye lenses sitting back to back and facing opposite directions will in principle cover a 360° view of the surroundings.

Image capture systems equipped with UWA lenses have many useful applications. Examples are surveillance and security monitoring cameras, video-conferencing systems, specialty photographic cameras, and vehicle camera systems. On a negative side, these lenses exhibit significant amount of distortions that pose a number of challenges. For example, the output of a typical fisheye lens is normally a two-dimensional (2D) circular (oval for a general wide-angle lens) mapping of a 3D visually familiar Euclidian space where objects lie in real world. Inevitably, horizontal and vertical lines would look skewed and appear curvilinear, more noticeably for the objects farther away from the center of the lens. The relative sizes of objects closer to the lens look exaggeratingly larger, so that different parts of an object look out of proportion. These effects are generally known as the fisheye distortions that make it difficult to judge distances and object relationships. This is in contrast with standard camera lenses which maintain the scene perspective and linearity by capturing a planar view. Moreover, to achieve a larger angular FOV, manufactures may use a combination of several lenses. That may further introduce optical and geometric distortions.

Several techniques are known in the art to address the fisheye distortions. The curvilinear images produced by a fisheye lens can be remapped onto a conventional rectilinear display. In a series of prior art patents from OmniView and IPIX Corp. a portion of the full viewing sphere is selected and corrected for fisheye distortions. Although this approach provides a powerful tool for viewing up to 360°, only a selected portion is available at a time. The rest of the image is saved that could be available upon further selections.

U.S. Pat. No. 7,961,980B2 utilizes cylindrical projections in connection with circular fisheye mappings. As is well known, cylindrical projections stretch distances east-west. In particular, the stretching diverges to infinity at the poles. This solution would be useful for creating panoramic images when the polar areas can be chopped off, again meaning loss of information. Although it is possible to take different orientation cylinders to build several images, still this does not provide a single zero-content-loss (ZCL) image, that is, an image containing all content from the original UWA captured scene, with no loss of information. In fact, it is physically impossible to achieve full perspective correction for all portions of the image at the same time by applying any transformation.

Therefore, the main drawback of prior art is loss of image content and information pertaining to objects and their relative positioning. In certain applications, such as a security or monitoring camera, it would be desired to be able to select areas of interest and correct for distortions, and yet be able to preserve the full content of the image at all times. The present invention discloses an intermediate approach, whereby image data for all pixels of the entire UWA lens captured image is maintained to prevent any loss of information after the mapping that corrects for distortions to a certain level, as much as theoretically allowed. Furthermore, a locally adaptive transformation can be applied to the regions of interest that aims to partially restore the distortions caused by the UWA lens. Partial image restoration has the objective of giving a reasonable indication of the object and its relationships to the surroundings, not a strict full-image perspective correction. This solution will be particularly useful for video monitoring applications where a full view of the surveillance must be available for every image frame, yet it would be possible to transform objects of interest.

SUMMARY

The embodiments described herein provide in one aspect, a method for transforming an input image captured through at least one ultra wide-angle (UWA) lens, said UWA lens characterized by a corresponding transformation that maps 3D object space onto a plane that displays the input image, said method comprising:
  (a) obtaining the input image data captured through the at least one UWA lens;
  (b) constructing a 2D surface envelope that fully encompasses field of view of the at least one UWA lens;
  (c) constructing an envelope transformation that maps an output image plane onto the surface envelope;
  (d) concatenating the UWA lens map and the envelope transformation to obtain a zero-content-loss transformation; and
  (e) applying the zero-content-loss transformation to the input image data to obtain an output image;
such that image perspective is substantially improved in the output image.

The embodiments described herein provide in another aspect an electronic processor for transforming an image captured through at least one ultra wide-angle (UWA) lens, said UWA lens characterized by a corresponding transformation that maps 3D object space onto a plane that displays the input image said processor comprising:
  (a) means to obtain input image data captured through the at least one UWA lens;
  (b) means to select a 2D surface envelope that contains field of view of the at least one UWA lens;
  (c) means to construct an envelope transformation that maps an output image plane onto the surface envelope;
  (d) means to concatenate the UWA lens map and the envelope transformation to obtain a zero-content-loss transformation; and
  (b) means to apply the zero-content-loss transformation to the input image data to obtain an output image;
such that image perspective is substantially improved in the output image.

BRIEF DESCRIPTION OF THE DRAWINGS

For a better understanding of the embodiments and/or related implementations described herein and to show more clearly how they may be carried into effect, reference will now be made, by way of example only, to the accompanying drawings which show at least one exemplary embodiment and/or related implementation in which:

FIG. 21b illustrates the stitched envelope mapping, combining the ZCL and perspective envelope mappings of FIG. 21a.

Figure 1:
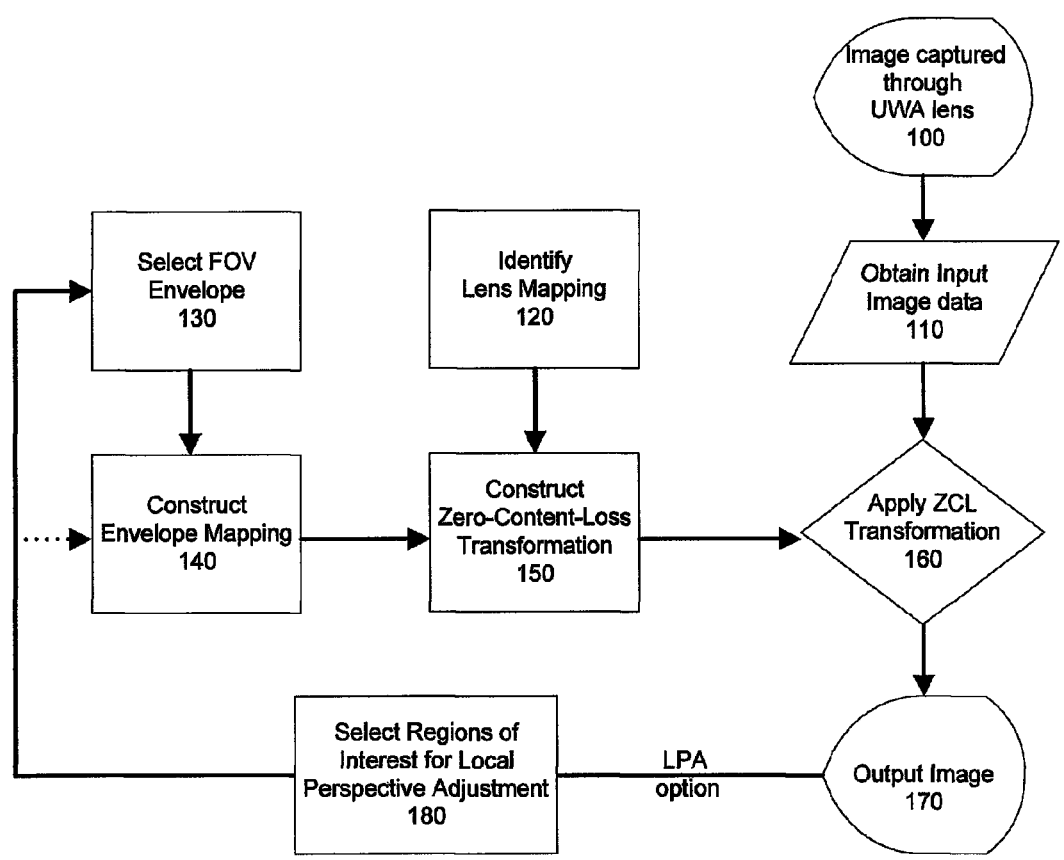
FIG. 1 illustrates an embodied method for applying a zero-content-loss transformation to an UWA lens acquired image.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein.

However, it will be understood by those of ordinary skill in the art that the embodiments and/or implementations described herein may be practiced without these specific details. In other instances, well-known methods, procedures and components have not been described in detail so as not to obscure the embodiments and/or implementations described herein. Furthermore, this description is not to be considered as limiting the scope of the embodiments described herein, but rather to describe the structure and operation of the various embodiments and/or implementations described herein.

It is well understood that an image acquired through a UWA lens cannot be unfolded on a normal (usually rectangular) display in its entirety, while having it perfectly corrected for perspective distortions. As mentioned, the prior art solutions have to sacrifice portions of the image content, perhaps deemed as less important, in order to correct for the rest. In accordance with an embodiment of the present invention, an intermediate solution is provided where the entire UWA lens acquired image is unfolded via a transformation that provides a high degree of correction, yet maintains all image information. A localized and content adaptive correction can further be applied to the key regions of interest, if required, which aims to partially restore some of the perspective lost or severely distorted by the UWA lens. Such a full-view transformation, with possible locally adaptive perspective corrections, will be referred to as Zero-Content-Loss (ZCL) correction. Partial restoration aims to give a reasonable indication of objects and their relationships, and not a strict perspective correction where loss of content would be unavoidable. The restoration process can also be viewed as redistributing the original distortions to regions of less importance.

To describe the embodiments, mainly an exemplary 180° lens will be used as the UWA lens to describe the method. Although it should be understood that this approach is applicable generally to any UWA lens or a combination of lenses covering up to a 360° of field of view. In particular, the embodied methods are applicable to custom UWA lenses which do not necessarily image as a circle, but may rather image as an ellipse or oval, such as the Panomorph lens from ImmerVision.

FIG. 1 illustrates an embodied method according which a zero-content-loss transformation is implemented. An image is captured 100 by a capture device equipped with a UWA lens, the captured image is referred to as the input image. Digital capture devices are normally equipped also with an image sensor, such as a CCD or CMOS, through which one can obtain input image data 110 comprising spatial and color coordinates of every and each image pixel. In absence of any perspective corrections, the input image is usually viewed as within an oval (circular being a special case) image boundary. This is referred to as the lens mapping, whereby a view from the real world three-dimensional (3D) object space is mapped onto a planer two-dimensional (2D) plane view. The lens mapping transformation needs to be identified 120 either as provided by the lens manufacturer, or modeled mathematically. Alternatively, a more precise and general mapping may be obtained empirically. Next, a 2D surface is selected 130 to fully encompass the FOV of the lens in 3D. This covering surface also referred to as the FOV-envelope, will later be described in great detail. A transformation 140 is then constructed to map an output image plane onto the FOV-envelope surface, where every pixel is accounted for, and in such a way that the output image 170 is substantially improved for perspective. The output image, displayed on a viewing surface, is therefore transformed in such a way that the perspective distortions are improved while all image content is preserved (hence ZCL transformation). That is achieved by concatenating the lens mapping and the FOV-envelope transformation 150, and applying the result to the input image 160.

Selecting the FOV-envelope and mapping of the output image to the surface of the FOV-envelope determine the amount and areas of the perspective transformations. Therefore if one requires local perspective adjustments to the transformations 180, one could re-select the envelope 130 and start over in order to modify the displayed output 170 accordingly. Alternatively, a different envelope transformation 140 can be applied with the same envelope (no need to alter 130) to tweak the output image. The local adjustments can be performed manually via an operator by selecting one or more areas of interest that need to be corrected, or it could be automated in response to changes in the captured image. For instance, a security camera might be equipped with a motion detector. Once a movement is detected, areas around the moving object (e.g. face of a person) can be selected as an area of interest for the local adjustments 180. Additional processing could also be applied to the selected areas, such as zooming in/out, rotation and reflection operations. This would assist image analytic techniques for post-processing, e.g. face recognition.

Figure 2:
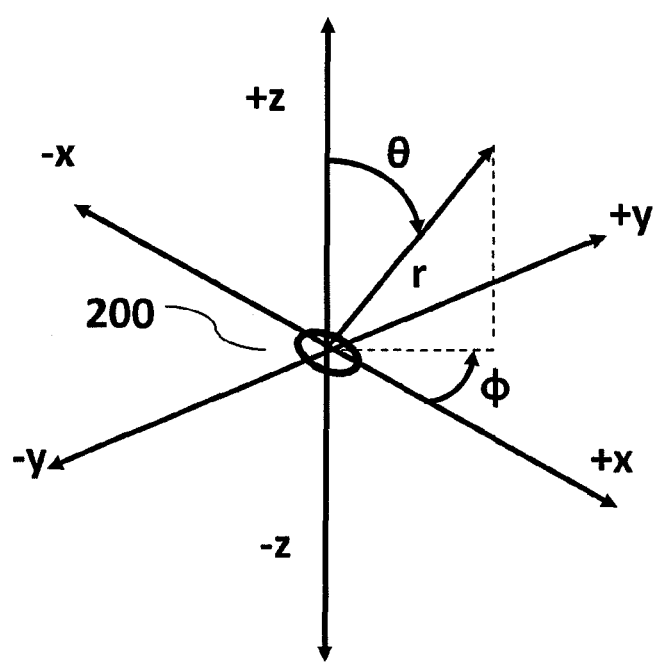
FIG. 2 illustrates the conventional Cartesian and spherical coordinate systems and conventions used in the disclosure.

The imaging of a standard camera (SLR type), with a standard non-UWA lens (example 35 mm lens) can be described using the ideal pinhole camera model. Though real cameras are much more complicated, this simple model suffices for the description below. A point in the 3D real world space with coordinates (x,y,z) is mapped to a point in the image (u,v) given by:

$$u = f\frac{x}{z}, v = f\frac{y}{z} \quad (1)$$

where f is the lens focal length and the optical axis is assumed to be along the z-axis. Equation (1) is referred to as the lens mapping equation for a standard lens; it maps a real world point to a point in the captured image. The image can be viewed as placed at a distance f from the lens center along the optical axis. The standard lens transformation preserves relative distances and angles of objects that are in the same z-plane, i.e. a plane perpendicular to the z-axis at some z coordinate, hence perspective is maintained. The resulting image is rectangular. Furthermore, rectangular coordinates are a natural coordinate system for describing non-UWA lens imaging. In contrast, a UWA lens is best described using a spherical/polar coordinate system. Let be (r,θ,φ) the spherical coordinates of a point in the 3D real world space (its rectangular coordinates being (x,y,z)) as shown in FIG. 2. A UWA lens 200 placed at the origin and looking up in +z direction maps the 3D point to a point (r',φ') in the image plane (not shown) given by:

$$r'=F_r^L(\theta,\varphi), \varphi'=F_\theta^L(\theta,\varphi) \quad (2)$$

where the superscript L refers to "Lens" and (r',φ') are the polar coordinates in the image related to rectangular coordinates by: x'=r' cos φ' and y'=r' sin φ'. In terms of rectangular coordinates (2) can be written as:

$$u = F_u^L(x, y, z) = F_r^L(\theta, \phi)\cos(F_\theta^L(\theta, \phi)),$$
$$v = F_v^L(x, y, z) = F_r^L(\theta, \phi)\sin(F_\theta^L(\theta, \phi)) \quad (3)$$
$$\theta(x, y, z) = \arccos\frac{z}{\sqrt{x^2 + y^2 + z^2}},$$
$$\phi(x, y, z) = \arctan\left(\frac{y}{x}\right)$$

It is understood that the inverse trig operations need to take into account quadrants and handle x=0. The functions are general with no dependence on the radial coordinate r; in particular they are also applicable to lenses which form elliptical or oval images. UWA lenses with no radial dependence will be referred to as conical-UWA lens. For special case of an ideal fisheye, these equations simplify to:

$$r'=\alpha\theta, \varphi'=\varphi, \alpha \text{ a constant} \quad (4)$$

Equations (2) to (4) are referred to as the conical-UWA lens and fisheye lens mapping equations respectively. Imaging obeying Equation (2) or (4) does not maintain relative distances and angles on fixed planes, leading to much distorted images. For example, for Equation (4), all points on a cone at a fixed θ map onto a circle in the image plane. The resulting fisheye image is circular as opposed to rectangular.

The benefit of the UWA lens, offsetting the severe distortion, is its much larger FOV. A fisheye field-of-view is defined as twice the maximum angle θ that can be captured, which gives a cone from the lens center:

$$\text{Fisheye FOV}=2\theta_{max} \quad (5)$$

For a 180° fisheye $\theta_{max}$=90, where the lens can capture a full hemispherical field of view. A standard lens, even with a wide angle variation is usually restricted to <=120° horizontally and much smaller vertically. We define a conical-UWA lens FOV by:

$$\text{Conical} - UWA\ FOV = 2 \times \min_{\phi}\{\theta_{max}(\phi)\} \quad (6)$$

This definition implies that $\theta_{max}$ may depend on $\varphi$, and the minimum is taken. For most practical cases, $\theta_{max}$ is independent of $\varphi$ and equation (5) can also be taken as the conical-UWA lens FOV.

Understanding the FOV is critical to implementing a zero-content-loss correction. To this extent we define a FOV-envelope for a lens, as mentioned in relation to coordinate system of FIG. 2, as a 2D surface covering (embedded in real world 3D space) that fully encompasses the field of view of the lens. Every ray drawn from an object point in the real world (object space) to the lens center, which is within the lens field of view, intersects the FOV-envelope at a unique point. Conversely, every point on the envelope corresponds to a unique ray that is captured by the lens. The FOV-envelope would not be unique. In general there are an infinite number of such surfaces for a given lens, however there will be a basic envelope which is the smallest and has a simple mathematical description. All other envelopes will be continuous transformations of the basic envelope. Two envelopes are considered as being equivalent if they can be continuously transformed into each other; an envelope equivalent to the basic envelope is also referred to as being an equivalent. The standard spherical and Cartesian coordinates of the envelope are denoted by $(r,\theta,\varphi)$ and $(x,y,z)$ respectively, which is the same notation used for the 3D real world space as in FIG. 2. For standard lenses (Equation (1)), the basic FOV-envelope would be a planar rectangular region containing the FOV, perpendicular to the optical axis. This is identical to the image plane at focal length f. For a conical-UWA lens, and in particular a fisheye lens, the basic FOV-envelope can be taken as the surface of a sphere of unit radius, with $\theta \leq \theta_{max}$:

$$\text{Conical-UWA FOV-envelope} = \{r=1, 0 \leq \theta \leq \theta_{max}, 0 \leq \varphi < 2\pi\} \quad (7)$$

Every point on the FOV-envelope, which corresponds to a real world ray, has its position in the captured image determined by the lens mapping equations. Given an envelope, an envelope mapping (or transformation) 140 can be defined, which combined with the lens mapping 120 results in a ZCL transformation 150. This is described in the following, referencing FIG. 1.

Let (u,v) be the coordinates of the 2D input image data 110 captured by the UWA lens. Since image sensors (used in digital cameras, etc.) are rectangular, this will be a rectangular frame with pixel resolution (width×height) $W_0 \times H_0$, containing within it the oval or circular UWA image. Let $(x_f, y_f)$ be the coordinates of the 2D image after the distortion correction, where the output image 170 is assumed to be a rectangular image of pixel resolution $W_1 \times H_1$. In most cases, the input and output resolutions are the same: $W_1 \times H_1 = W_0 \times H_0$. However, the notation is kept general to allow for a change in resolution as well. An envelope mapping 140 is defined as a mapping $(F_x^C, F_y^C, F_z^C)$ of the output coordinates $(x_f, y_f)$ onto a basic (or any equivalent) FOV-envelope of the lens ((x,y,z) denote coordinates on the envelope):

$$x = F_x^C(x_f, y_f)$$

$$y = F_y^C(x_f, y_f)$$

$$z = F_z^C(x_f, y_f) \quad (8)$$

An equivalent set of spherical coordinate equations can also be written:

$$r = F_r^C(x_f, y_f)$$

$$\theta = F_\theta^C(x_f, y_f)$$

$$\varphi = F_\varphi^C(x_f, y_f) \quad (9)$$

The two sets related in the usual manner:

$$F_r^C = \sqrt{(F_x^C)^2 + (F_y^C)^2 + (F_z^C)^2} \quad (10)$$

$$F_\theta^C = \arccos\frac{F_z^C}{\sqrt{(F_x^C)^2 + (F_y^C)^2 + (F_z^C)^2}},$$

$$F_\phi^C = \arctan\left(\frac{F_y^C}{F_x^C}\right)$$

Maps (8) and (9) are also referred to as the envelope covering; hence the superscript "C" is used herein. Every 3D point on the FOV-envelope has one point in the output 2D image which maps onto it. Further, every point on the envelope will have a unique mapped point in $(x_f, y_f)$. By definition of the FOV-envelope, this ensures that every point seen in the captured image will also be seen in the output image hence providing no loss of content. A zero-content-loss (ZCL) transformation 150 is obtained by concatenating the envelope mapping 140 with the lens mapping 120. This provides a mapping between the output and the input image containing all the original content, which is used to determine the pixel value at $(x_f, y_f)$. The equations for a ZCL transformation take the form:

$$u = F_u^L(F_x^C(x_f, y_f), F_y^C(x_f, y_f), F_z^C(x_f, y_f)) \equiv F_u^{ZCL}(x_f, y_f)$$

$$v = F_v^L(F_x^C(x_f, y_f), F_y^C(x_f, y_f), F_z^C(x_f, y_f)) \equiv F_v^{ZCL}(x_f, y_f) \quad (11)$$

Analogous equations can be written in spherical/polar coordinates.

The zero-content-loss transformation is designed to restore a certain level of perspective in areas of interest. Therefore it is also referred to as a zero-content-loss correction. As mentioned above, this is not strict perspective correction (which is theoretically impossible for the full view), but an approximation to provide a better viewing experience and an improved sense of spatial placement of objects. The above framework provides with two means of modifying the correction:

a) Selecting a different basic equivalent FOV-envelope 130, via a continuous transformation of the starting envelope.

b) Modifying the envelope transform 140. Note that the lens mapping 120 is determined by the lens and is not an adjustable transform.

It should further be noted that a) also includes a change in the envelope transformation, however b) may be implemented without a). By appropriately modifying the envelope and its transform, different types of correction can be obtained.

According to one embodiment, the ZCL correction in the present approach has the ability to adapt to the image content for further correction of local perspective and other transformations in a specific region. In what follows, a systematic approach to constructing local perspective adjustments will be described. A correction with this property will be referred to as being locally-perspective-adaptive (LPA). Preferably, the FOV-envelope and the envelope transform are built in a parameterized manner, so that they can be quickly modified by changing specific parameters. This can often be achieved by starting with an envelope and transformation, whose mathematical properties are simple to handle. Once a ZCL correction is obtained either in equation form or as a set of grid points, it can be applied to images or video signals at real-time rates. For example, a highly efficient image warping hardware as described in the U.S. Pat. No. 7,324,706 can be employed for achieving this.

Figure 3A:
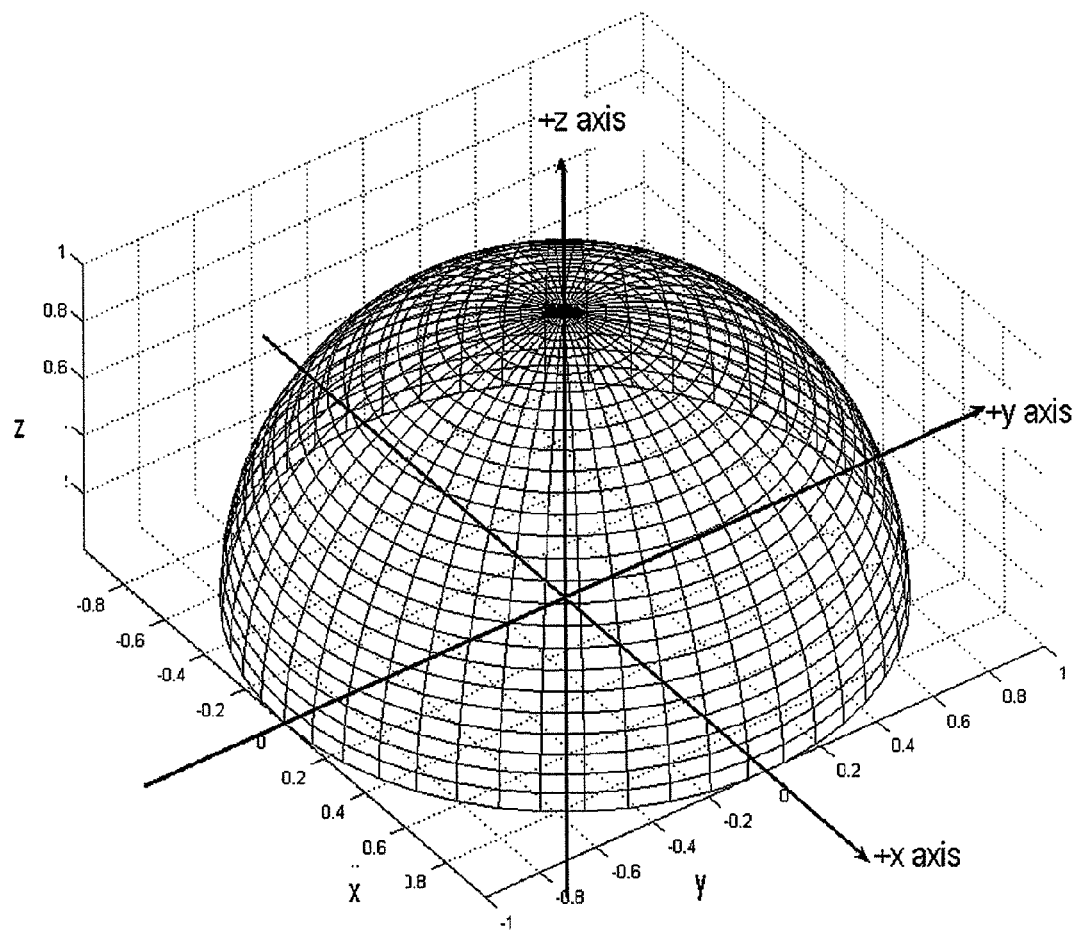
FIGS. 3a and 3b illustrate an exemplary spherical and ellipsoid FOV-envelope respectively for a 180° UWA lens.
Figure 3B:
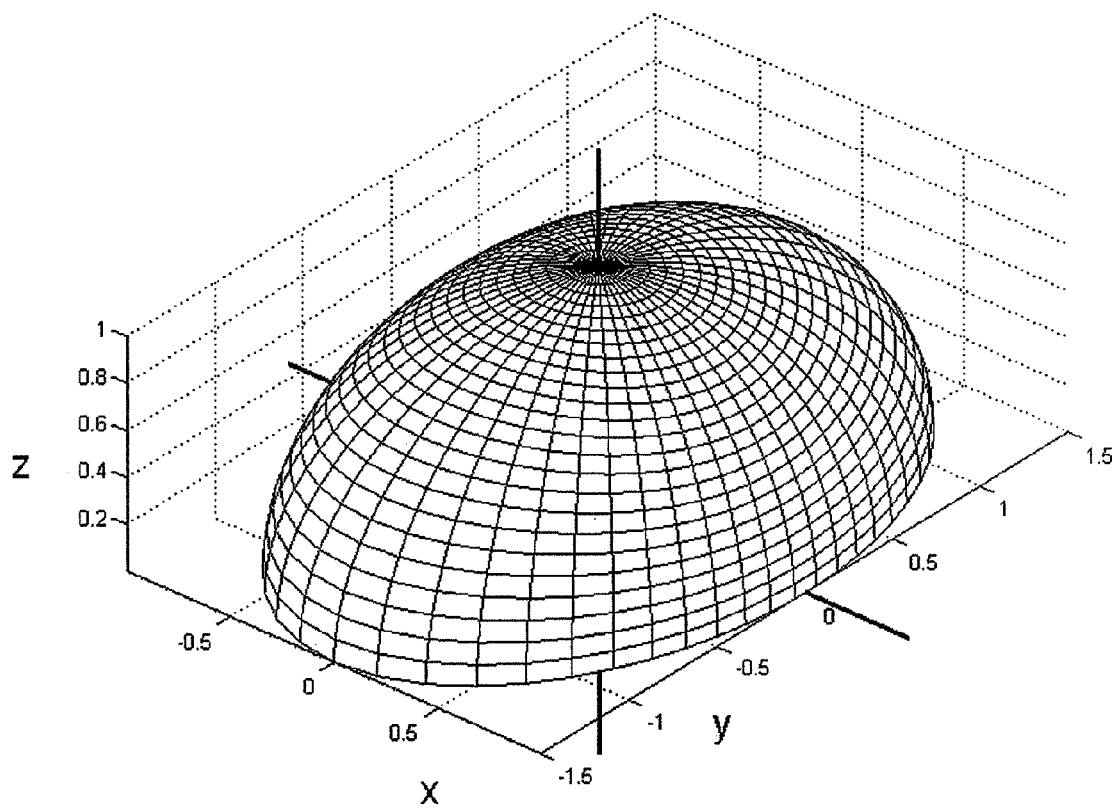
Figure 4A:
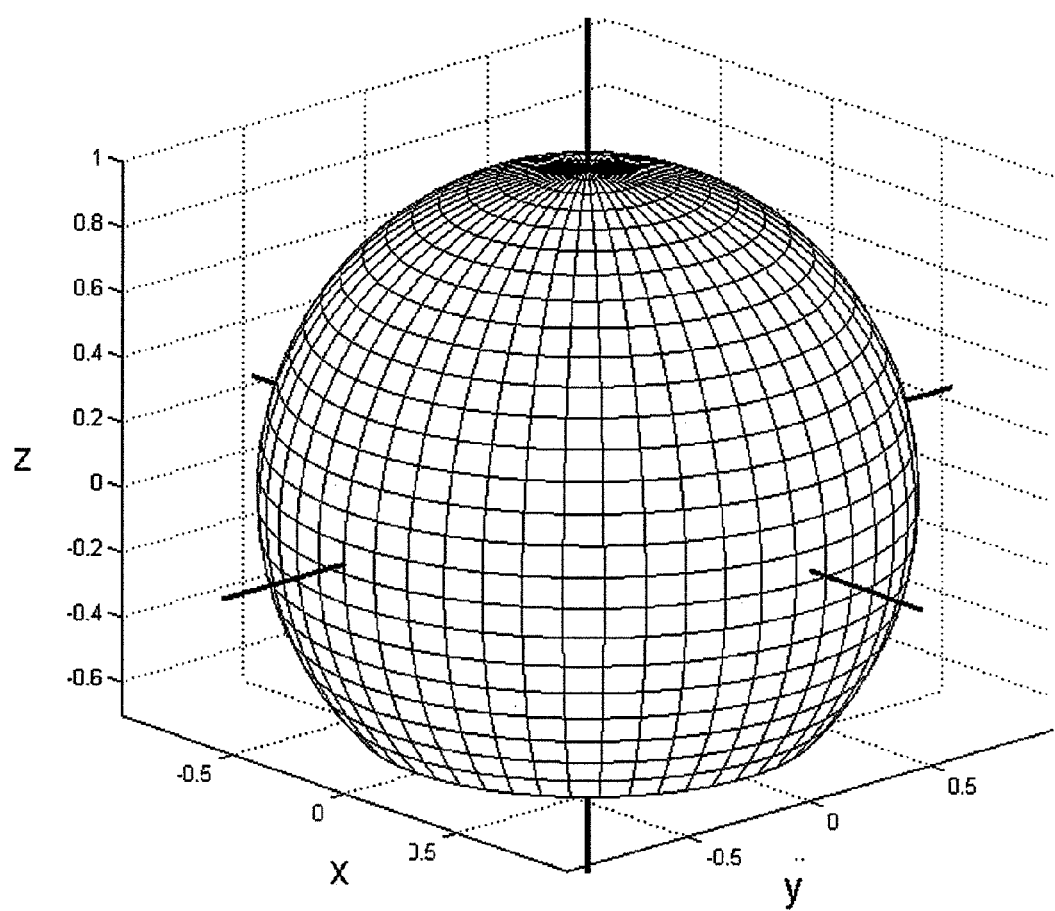
FIGS. 4a and 4b illustrate an exemplary spherical and ellipsoid FOV-envelope respectively for a 270° UWA lens.
Figure 4B:
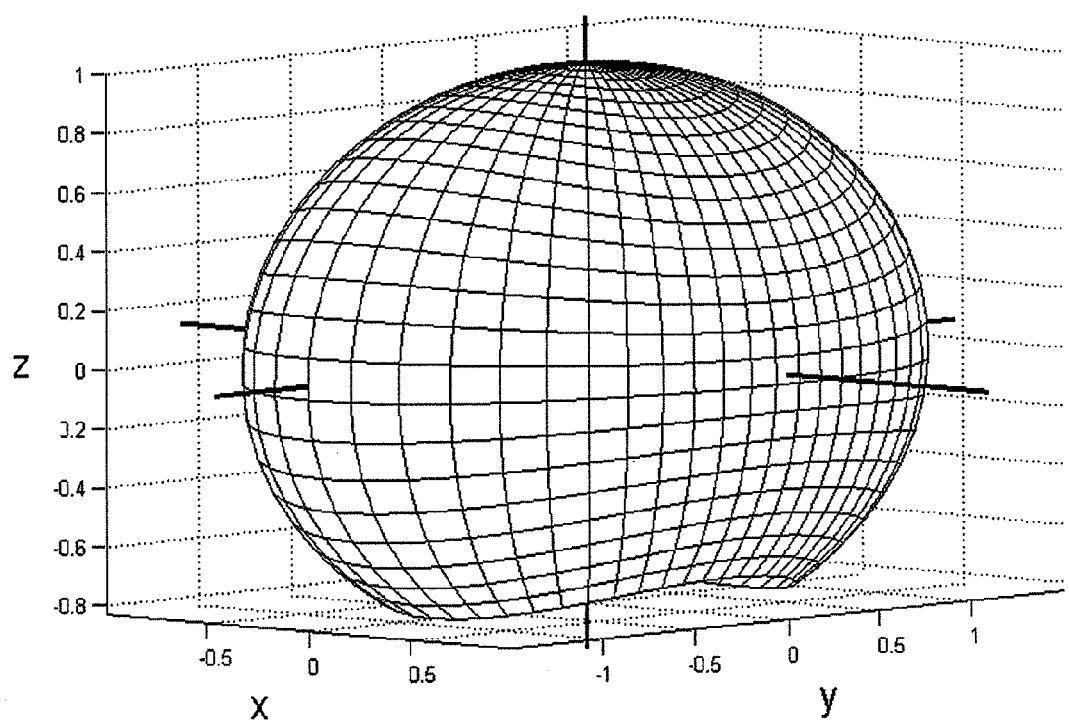

To illustrate the embodied method, a 180° conical-UWA lens is described as an exemplary UWA lens, with the lens mapping simplified by restricting the conical-UWA lens to a fisheye lens. For a 180° conical-UWA lens, the basic FOV-envelope with $\theta_{max}=90$ is a half sphere, as shown in FIG. 3a. FIG. 3a is consistent with the coordinate convention introduced in FIG. 2, i.e. the lens is placed at the origin (0, 0, 0) and looks outward along the +z axis (the optical axis). The angle $\theta$ is measured from the +z axis, and the angle $\varphi$ is measured clockwise from the +x axis. An equivalent FOV-envelope could be a half ellipsoid, shown in FIG. 3b with the y semi-axis being longer. Any half ellipsoid with arbitrary semi-axes lengths forms an equivalent FOV-envelope. The ellipsoid, that in fact generalizes a sphere, will provide a different ZCL correction in comparison with the sphere. In another example, FIGS. 4a and 4b show two equivalent FOV-envelopes (a sphere and an ellipsoid) for UWA lenses with >180° FOV, specifically 270° as depicted.

Having identified a FOV-envelope, the next step is to construct the envelope transformation 140, which is the mapping of the output image onto the envelope. In an exemplary illustration within the framework of ZCL, a good starting point would be to consider standard projections onto the globe used by cartographers to build flat 2D maps. In particular, the most relevant is the cylindrical projection, whose mathematics is readily understandable. The polar divergence trouble of cylindrical transformations, as described above, makes cylindrical projections less useful for constructing ZCL transformations. Regardless of the limitations, it is informative to see the equations for a ZCL transformation built via cylindrical projection.

There exist various types of cylindrical projections. Lambert projection is one example, employed here without loss of generality. With reference to FIG. 3a, the cylinder would have its axis along the y axis and is formed by wrapping the output image (rectangular of resolution $W_1 \times H_1$) around the basic envelope in FIG. 3a. The poles are at $(r=1, \theta=\pi/2, \varphi=\pi/2)$ and $(r=1, \theta=\pi/2, \varphi=-\pi/2)$. The cylindrical mapping from the image coordinates $(x_f, y_f)$ to the FOV-envelope is given by:

$$\phi_{xz} = \pi\left(1 - \frac{x_f}{W_1}\right) \equiv \pi \bar{x}_f \qquad (12)$$

$$\cos\theta_y = \left(1 - 2\frac{y_f}{H_1}\right) \equiv \bar{y}_f$$

where the range of $(x_f, y_f)$ is $[0, W_1] \times [0, H_1]$, i.e. the output image, $\theta_y$ is the polar (zenith) angle relative to the +y axis and $\varphi_{xz}$ is the azimuthal angle in the xz-plane measured from the +x axis, with clockwise towards the +z axis. The choice of using $(\theta_y, \varphi_{xz})$ is dictated by the orientation of the cylinder relative to the envelope. This can be converted to the standard coordinates using (even though r=1 on the basic envelope its dependence via r=R is explicitly shown, which will be useful when modifying envelopes):

$y = R\cos\theta_y$ $R_{xz} = \sqrt{R^2 - y^2}$ $x = R_{xz}\cos\varphi_{xz} = R\sin\theta_y\cos\varphi_{xz}$ $z = R_{xz}\sin\varphi_{xz} = R\sin\theta_y\sin\varphi_{xz} \qquad (13)$ Converting to the standard spherical coordinates:

$$r = R \qquad (14)$$

$$\theta = \arccos\left(\frac{z}{R}\right)$$

$$\phi = \arctan\left(\frac{y}{x}\right)$$

Figure 5A:
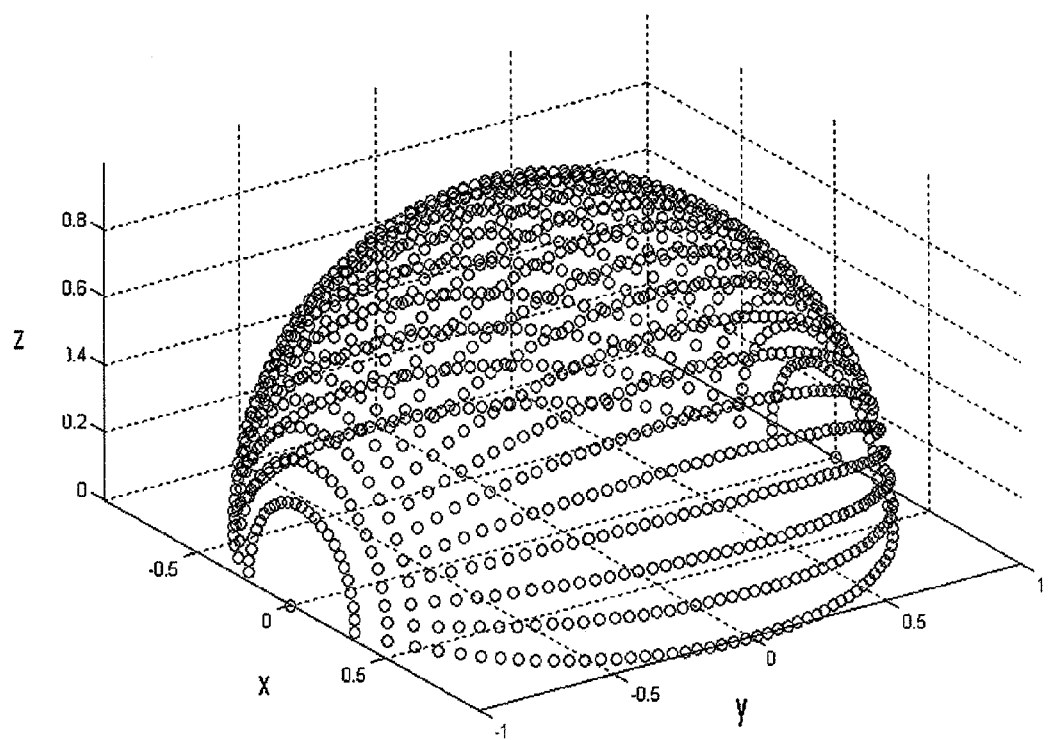
FIG. 5a illustrates a cylindrical mapping using a hemispherical FOV-envelope for a number of grid points.

It should be understood that the arc-tangent needs to take into account quadrants and handle x=0. Equations (12), (13) and (14), all give the same envelope transform based on cylindrical projection. This transformation is illustrated in FIG. 5a for a given set of points on the output image. To compute the final zero-content-loss correction, we next map the envelope coordinates onto the input image using the mapping equations (3) and (4). For the 180° fisheye lens, combining (13) and (4) gives:

$$u = \alpha\arccos(\sin\theta_y\sin\phi_{xz})\frac{\sin\theta_y\cos\phi_{xz}}{\sqrt{\cos^2\theta_y + \sin^2\theta_y\cos^2\phi_{xz}}} \qquad (15)$$

$$v = \alpha\arccos(\sin\theta_y\sin\phi_{xz})\frac{\cos\theta_y}{\sqrt{\cos^2\theta_y + \sin^2\theta_y\cos^2\phi_{xz}}}$$

$$\alpha = \frac{R_I}{\theta_{max}}$$

where $R_I$ is the radius of the circular fisheye input image captured by the lens; the equation for the proportionality factor $\alpha$ is that of a circular fisheye.

Figure 5B:
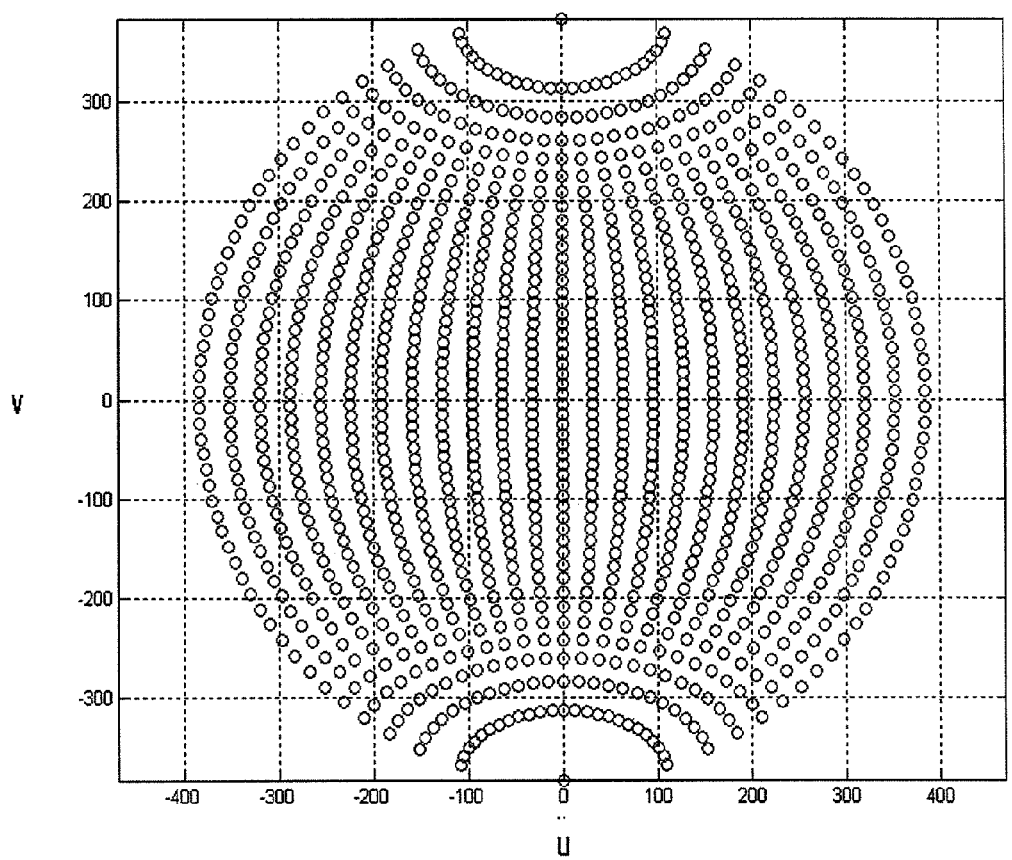
FIG. 5b shows the corresponding grid as it would appear on the input image.

Referring to FIG. 5b, the coordinate system on the input image space is taken to be the standard Cartesian coordinates, with the origin at the center, +u to the right and +v to the top. This can be converted to conventional computer coordinates. From equation (15) one can see that the lines $y_f=0$ and $y_f=H_1$, corresponding to $\theta_y=0$ and $\theta_y=\pi$ respectively, are mapped to a single point in the input image: $(u=0, v=+R_I)$ and $(u=0, v=-R_I)$. This mapping completely destroys the perspective towards the top and bottom of the output image; hence this is not a very useful ZCL correction. FIG. 5a illustrates the envelop transform and FIG. 5b illustrates the final ZCL transformation for a set of gird points on the output image, using the cylindrical projection.

By modifying the envelop transform (12), within the framework of cylindrical projections, variations of the ZCL transformation can be obtained. However, the same "infinite stretching" limitation is encountered for all such cases. Two exemplary variations, which amount to modifying the second relation in (12), are given below:

$$\theta_y = \pi\frac{y_f}{H_1} \qquad \text{(Zenith Linear)} \qquad (16)$$

$$\theta_y = \frac{\pi}{2} - \arctan\left(\sinh\left(s_f\left(1 - 2\frac{y_f}{H_1}\right)\right)\right) \quad \text{(Mercator)}$$

Equation (15) continues to hold since it is based on the lens mapping equation and does not change. Combining (15)

with the new substitutions (16), the zero-content-loss transformation can be computed. The first variation, which is labeled zenith linear, changes the scale in the y direction in comparison with the Lambert projection; the same infinite stretching is still seen at the poles. The second variation is actually a Mercator cylindrical projection, where $s_f$ is a scale factor that controls the vertical stretching. This becomes a zero-content-loss transformation only in the limit $s_f \to \infty$, in which case there is infinite vertical stretching. Nevertheless, even for small ($s_f \geq 4$), which may be "zero-content-loss" for most practical purposes, the distortion introduced is very severe.

Figure 6:
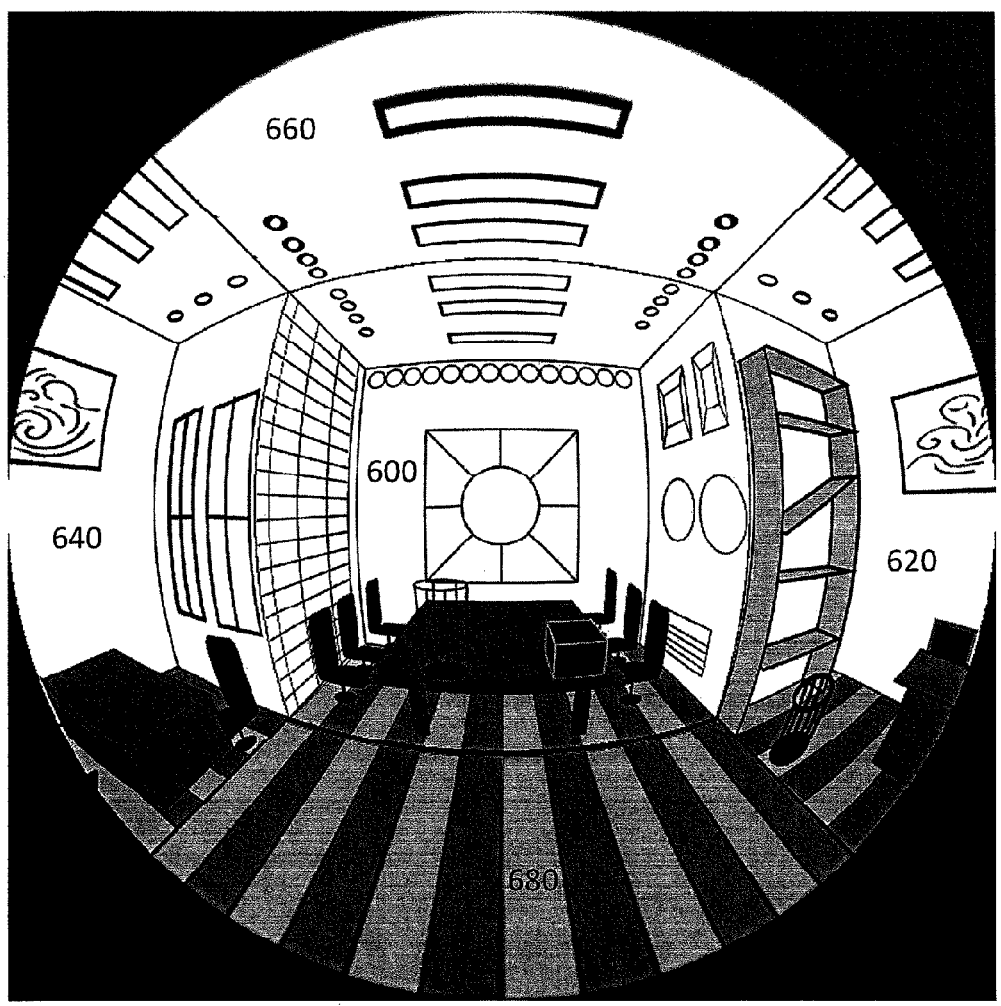
FIG. 6 illustrates an exemplary input image acquired through a 180° UWA lens as part of a monitoring device.
Figure 7:
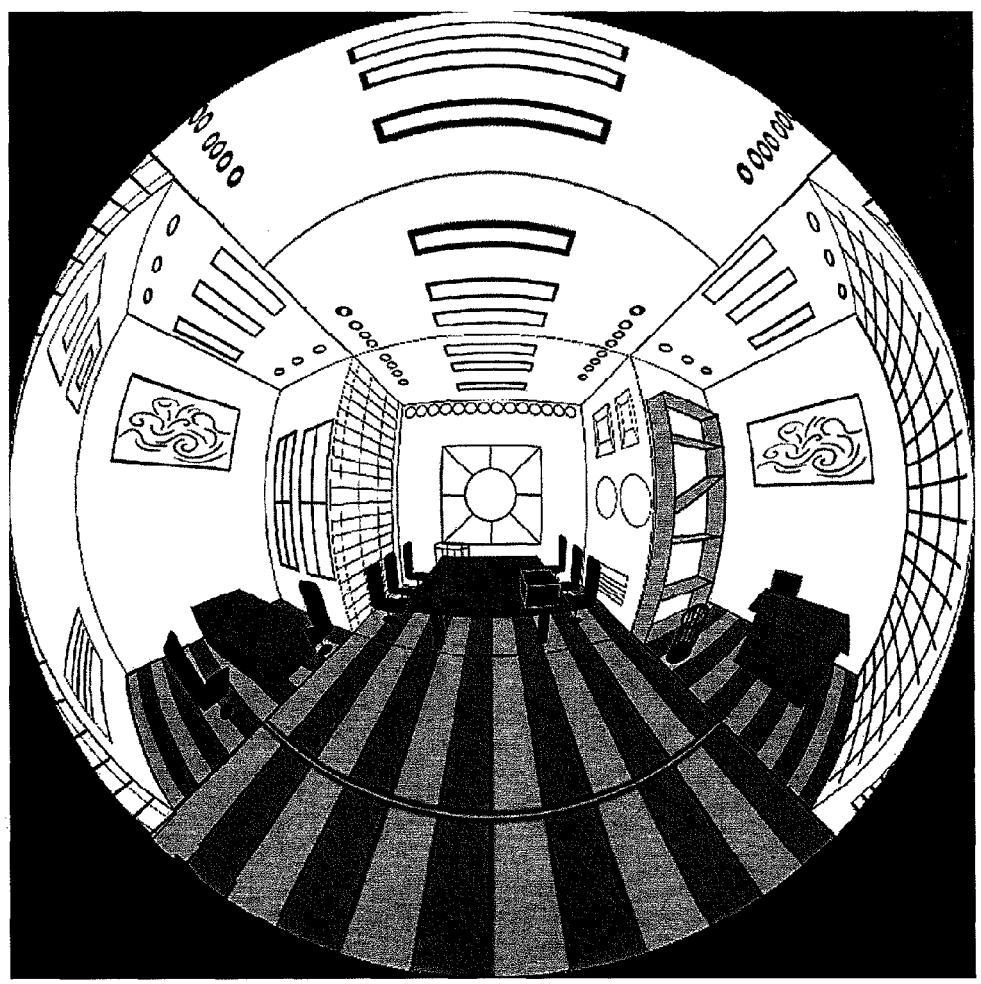
FIG. 7 illustrates an exemplary input image acquired through a 270° UWA lens as part of a monitoring device.

Referring to FIG. 6, a simulated 180° conical-UWA (circular) lens image is used as the input image to illustrate how an exemplary zero-content-loss transformation performs, in accordance with the embodiments of the invention. The scene depicted in FIG. 6 consists of three similar size and adjacent rooms, wherein rooms 620 and 640 are at right angle to 600. In other words, the room fronts form 3 interior faces of a cube. A UWA lens placed at the center of the cube is looking directly (and along the perpendicular bisectors) at the middle room 600. The distortions introduced by the lens, increasing in the radial direction from the center, are clearly seen. Towards the image edge, objects become more "curved". Nevertheless being a UWA lens, it does capture everything in a 180° hemispherical view including parts of the ceiling 660 and the floor 680. The setting of FIG. 6 can easily be extended to a 360° view by adding a second similar lens facing the opposite direction. Therefore, what is said in regard to one fisheye lens can be extended to two fisheyes. Another simulated image shown in FIG. 7 illustrates input image acquired from a 270° lens, wherein the entire side rooms 720 and 740 (show on image) are within the FOV, although severely distorted as expected. Both FIGS. 6 and 7 are formed by a lens obeying lens mapping equation (4).

Figure 8:
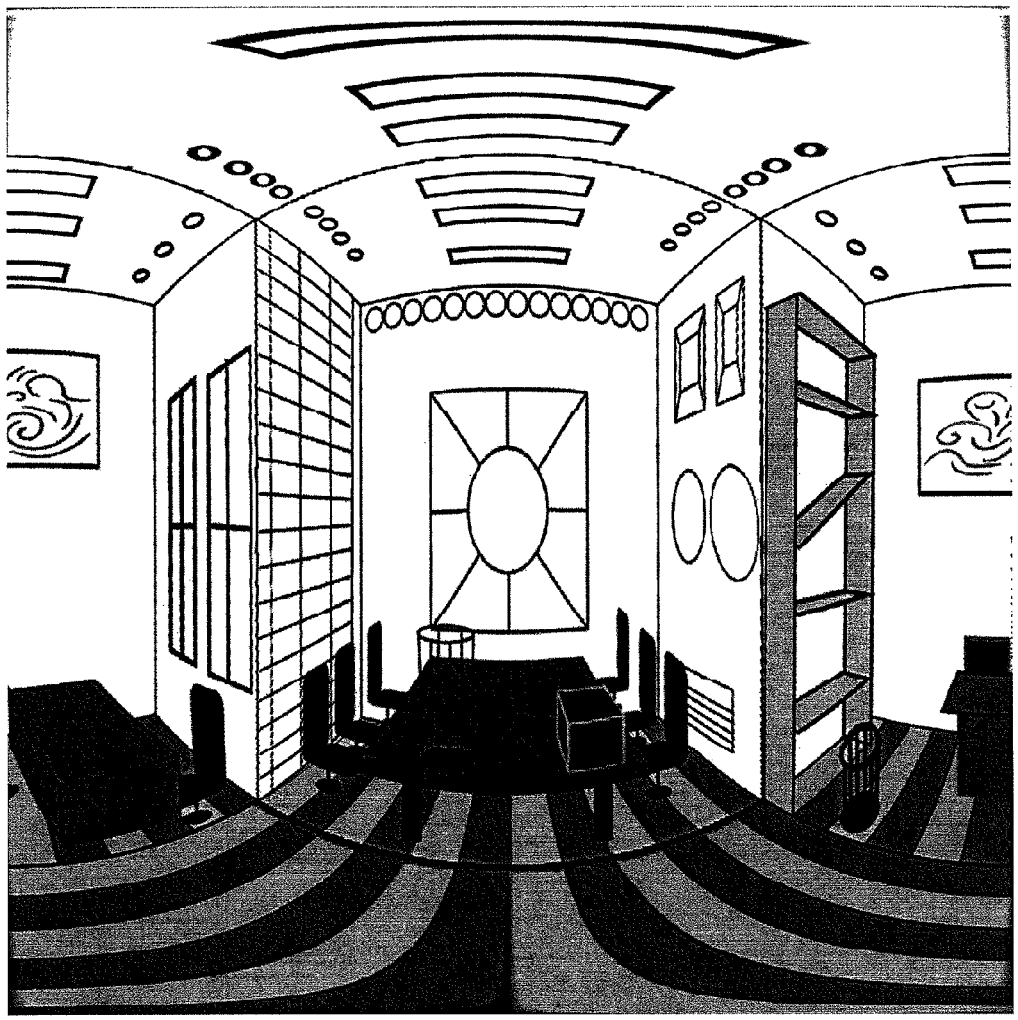
FIG. 8 illustrates a result of a zero-content-loss transformation applied to the input image of FIG. 6 using Lambert cylindrical projection.
Figure 9:
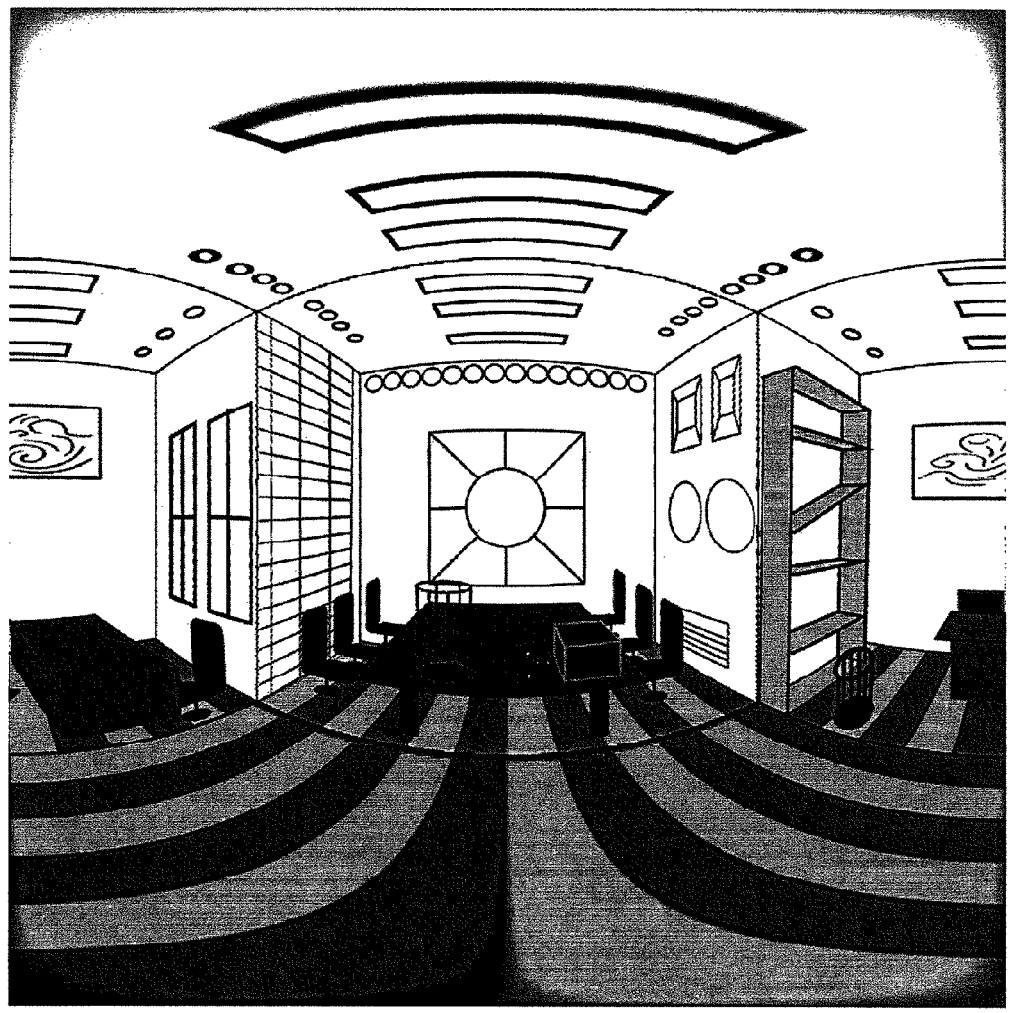
FIG. 9 illustrates a result of a zero-content-loss transformation applied to the input image of FIG. 6 using Zenith linear cylindrical mapping.
Figure 10:
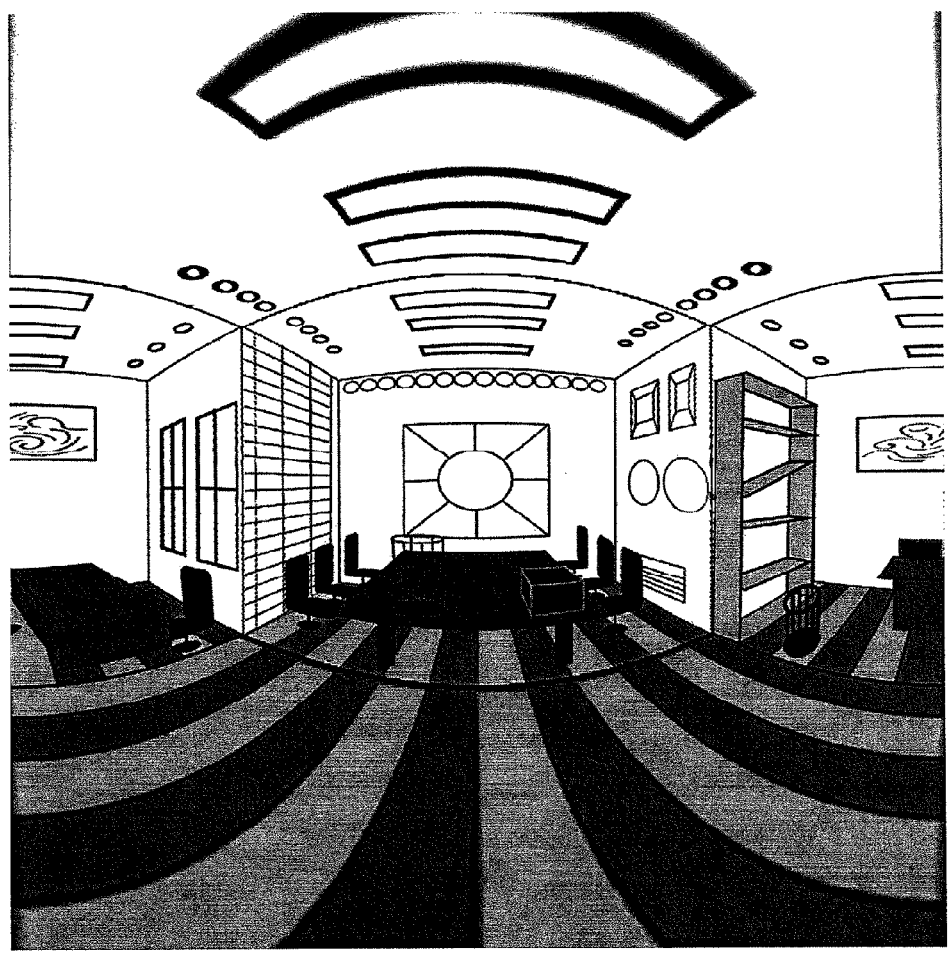
FIG. 10 illustrates a result of a partial zero-content-loss transformation applied to the input image of FIG. 6 using Mercator cylindrical mapping.

FIGS. 8 to 10 show the result of ZCL transformations, based on the cylindrical projection (15) applied to the input image FIG. 6. Teachings of the U.S. Pat. No. 7,324,706 have been employed to obtain output FIGS. 8 to 10 by implementing the given transformations in it's de-warp scheme. FIG. 8 is based on the Lambert projection, FIG. 9 on the zenith linear projection and FIG. 10 on the Mercator projection ($s_f=2$) of equation (16). The infinite stretching at the poles is apparent; this is especially visible on the floor where the carpet at the center appears torn towards opposite directions. In other words, all perspective near the poles is lost. The horizontal object lines are also made more curved than the original UWA lens image which distorts the perspective towards the left and right of the field of view. For instance, this mapping gives the illusion that the three rooms all lie along a line. Further, the diagonal ceiling/floor boundaries of the left and right rooms become fully horizontal at the edges, whereas a less distorted perspective would keep these lines diagonal. However, as needed for perspective, the vertical object lines are straightened. These properties make cylindrical projections not well suited for ZCL transformations aiming to improve perspective. Nevertheless, the straightening out of verticals and diagonals at edges does make these transform useful for panoramic views, where the zenith angle is usually cropped to a smaller range.

According to a preferred embodiment, a different envelope transform can be constructed to avoid the above artifacts resulted from cylindrical projections. This approach is specifically tailored towards ZCL transformation with perspective correction, using a parameterized envelope transform that can be modified to adjust the regions of, and amounts of, residual distortion. Furthermore, it includes a correction mechanism for recovering true local perspective. This technique supports any UWA lens, including non-circular conical-UWA lenses. Supporting arbitrary lenses in the context of ZCL correction is a direct consequence of the embodied method (as described in reference to FIG. 1), whereby an envelope mapping is defined separate from the lens mapping.

Accordingly, consider a conical-UWA lens with basic envelope that may cover greater than 180° FOV and is not limited to capturing circular images. An equivalent envelope is given by the partial surface of an ellipsoid shown in FIG. 11:

$$\frac{x^2}{r_x^2} + \frac{y^2}{r_y^2} + \frac{z^2}{r_z^2} = 1 \quad (17)$$

$$\theta \leq \theta_{max}$$

Figure 11:
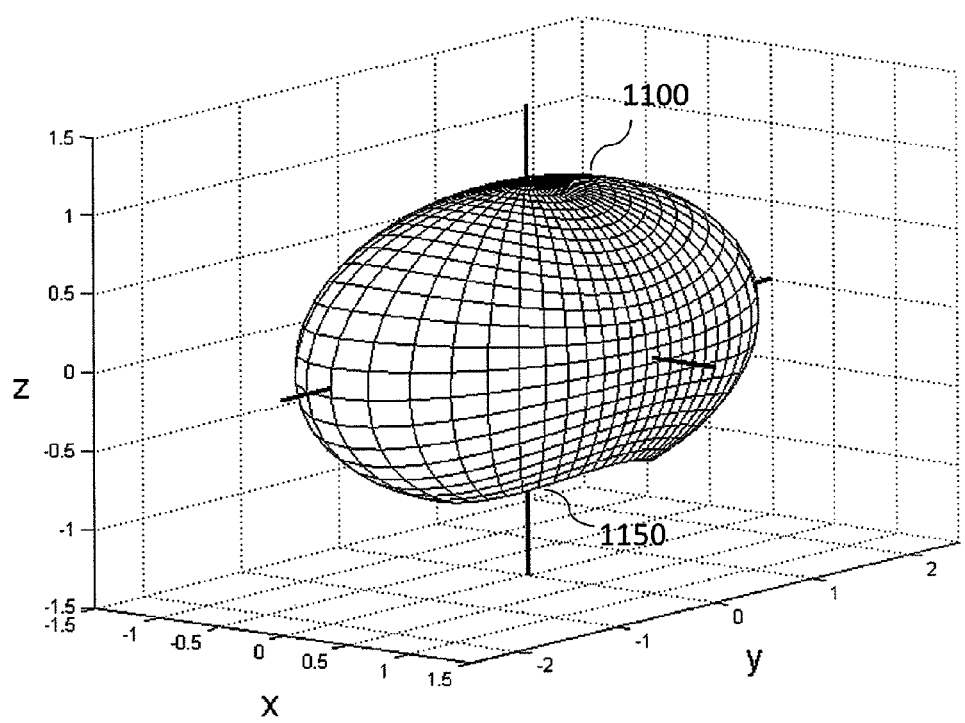
FIG. 11 illustrates an ellipsoid envelope covering a FOV >180°.

The envelope 1100 is the part of the ellipsoid that lies above $\theta_{max}$. Here $r_{x,y,z}$ denote the semi-axes lengths. The ellipsoid generalizes a sphere and provides three parameters, the semi-axes lengths, for modifying the envelope transform. The lens is again assumed to be sitting at the origin looking towards the +z axis. $r_x$ and $r_y$ provide scaling controls in the x and y directions respectively, whereas $r_z$ gives control of scaling in the z direction corresponding to a magnification. The ellipsoid envelope 1100 of FIG. 11 is drawn for a general value of the semi-axes. Accordingly, the boundary $\theta = \theta_{max}$ is an elliptical shape 1150. Note the boundary in general does not lie in a plane for an ellipsoid. The boundary 1150 will be referred to as the envelope boundary or e-boundary.

Referring to FIG. 11, the envelope transformation maps an output rectangular image $W_1 \times H_1$ (not shown) onto the ellipsoid surface 1100. In the first step of the construction, the image rectangular boundary is mapped to the boundary 1150 of the envelope. Looking along the z-axis, the boundary 1150 appears as an ellipse (for a sphere it becomes a circle); as illustrated 1250 in FIG. 12. We define an angle $0 < \psi_0 < \pi/2$, called the boundary partition angle, which divides the boundary into 4 segments (note $\theta = \theta_{max}$ for the segments):

$$\text{Top } e\text{-boundary: } -\psi_0 + \frac{\pi}{2} \leq \phi \leq \psi_0 + \frac{\pi}{2} \quad (18)$$

$$\text{Bottom } e\text{-boundary: } -\psi_0 - \frac{\pi}{2} \leq \phi \leq \psi_0 - \frac{\pi}{2}$$

$$\text{Left } e\text{-boundary: } \psi_0 + \frac{\pi}{2} \leq \phi \leq -\psi_0 + \frac{3\pi}{2}$$

$$\text{Right } e\text{-boundary: } \psi_0 - \frac{\pi}{2} \leq \phi \leq -\psi_0 + \frac{\pi}{2}$$

Similarly there are the 4 obvious boundaries of the output image (not shown), referred to as the image boundaries, or i-boundaries:

Top i-boundary: $y_f = 0, 0 \leq x_f \leq W_1$

Bottom i-boundary: $y_f = H_1, 0 \leq x_f \leq W_1$

Left i-boundary: $x_f = 0, 0 \leq y_f \leq H_1$

Right i-boundary: $x_f = W_1, 0 \leq y_f \leq H_1$ \quad (19)

The i-boundaries are mapped to the corresponding e-boundaries (top to top, etc.) by finding a function that takes x or y to φ; the boundary mapping. For the top and bottom boundaries, any monotonic function of x can be used and for the left and right any monotonic function of y. To maintain symmetry about the horizontal and vertical center axes (which is common for most lenses); maps which are symmetric about the boundary centers are preferred, specifically the i-boundary centers are mapped to e-boundary centers. An exemplary boundary map can be given by the following linear functions:

$$\text{Top map: } \phi = \phi_T(x_f) = \frac{\pi}{2} + \psi_0 - 2\psi_0 \frac{x_f}{W_1} \quad (20)$$

$$\text{Bottom map: } \phi = \phi_B(x_f) = -\frac{\pi}{2} - \psi_0 + 2\psi_0 \frac{x_f}{W_1}$$

$$\text{Left map: } \phi = \phi_L(y_f) = \frac{\pi}{2} + \psi_0 + 2\left(\frac{\pi}{2} - \psi_0\right)\frac{y_f}{H_1}$$

$$\text{Right map: } \phi = \phi_R(y_f) = \frac{\pi}{2} - \psi_0 - 2\left(\frac{\pi}{2} - \psi_0\right)\frac{y_f}{H_1}$$

Symmetry implies the following useful relations between the maps:

$$\varphi_T(x_f) = -\varphi_B(x_f)$$

$$\varphi_L(y_f) = \pi - \varphi_R(y_f) \quad (21)$$

From the maps above, the x-y-z coordinates can be computed using:

$$x = r_{xyz} \sin\theta_{max} \cos\varphi$$

$$y = r_{xyz} \sin\theta_{max} \sin\varphi$$

$$z = r_{xyz} \cos\theta_{max} \quad (22)$$

where $r_{xyz}$ is the distance from the center to the point on the e-boundary which, unlike the sphere, varies with the polar angles. It can be computed by plugging (22) into (17) to be:

$$r_{xyz} = \frac{r_x r_y r_z}{\sqrt{D_{xyz}}} \quad (23)$$

$$D_{xyz} = r_y^2 r_z^2 \cos^2\phi \sin^2\theta_{max} + r_x^2 r_z^2 \sin^2\phi \sin^2\theta_{max} + r_x^2 r_y^2 \cos^2\theta_{max}$$

Figure 12:
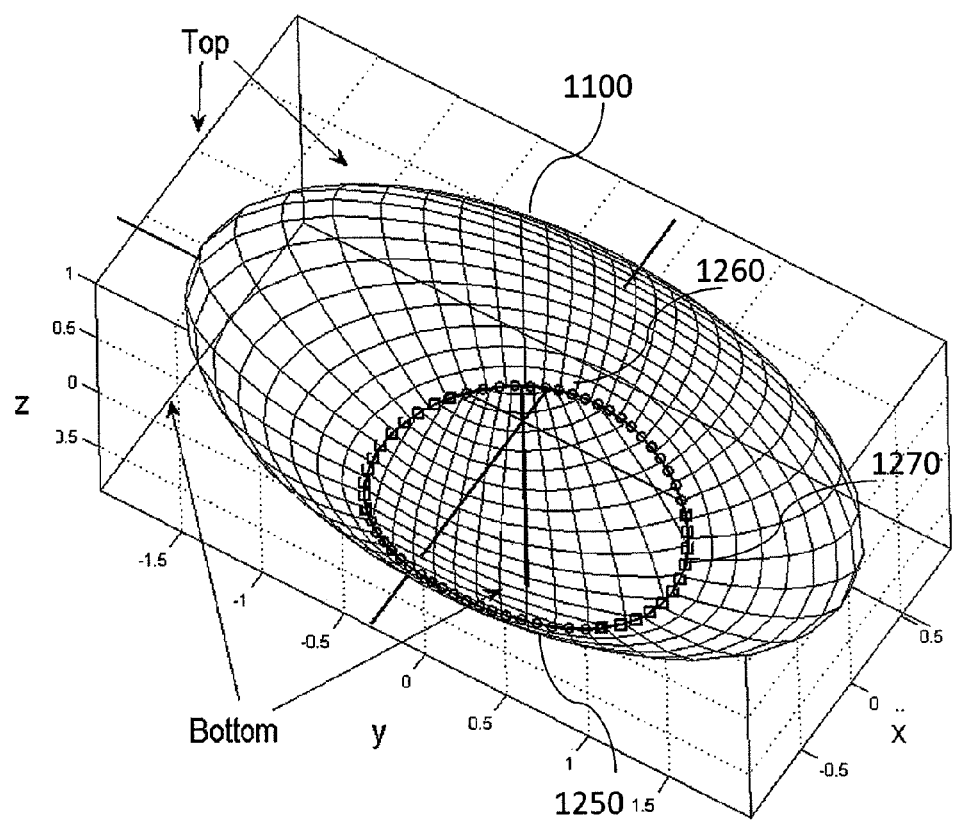
FIG. 12 illustrates mapping the boundary of the FOV-envelope.

Equation (22) gives the envelope transform for the boundary 1250. FIG. 12 shows the boundary mapping for a set of circular points 1260 and squares 1270 on the output image boundary. The circles 1260 correspond to points on the left/right boundaries, and the squares 1270 correspond to points on the top/bottom boundaries.

More complicated boundary maps in place of (20) can be used to obtain different transformations. Another example is to select φ to depend on x or y, such that an equal change in x or y, corresponds to equal distance movements along the boundary curve. This requires computing the arc-length, and an example shall be provided below for the mapping of interior (non-boundary) points. Regardless of the map, equation (22) remains valid.

The next stage consists of extending the boundary map to all interior points, hence getting the full envelope transformation. The idea is to map image scan-lines (pixel rows) to the envelope by wrapping them around the ellipsoid, with their end-points lying on the left and right e-boundaries. Consider a pixel row in the output image:

$$\text{Row at } y_f = y_{f0}, 0 \leq x_f \leq W_1 \quad (24)$$

The end-points of this row, $(0, y_{f0})$ and $(W_1, y_{f0})$, have their mapping to the envelope already determined by the boundary mapping 1260. We label these end-points on the envelope boundary as follows:

$$\left.\begin{array}{l} x_L = r_{xyz}\sin\theta_{max}\cos\phi_{L0} \\ y_L = r_{xyz}\sin\theta_{max}\sin\phi_{L0} \\ z_L = r_{xyz}\cos\theta_{max} \\ \phi_{L0} = \phi_L(y_{f0}) \end{array}\right\}\text{Left end-point} \quad (25)$$

$$\left.\begin{array}{l} x_R = r_{xyz}\sin\theta_{max}\cos\phi_{R0} \\ y_R = r_{xyz}\sin\theta_{max}\sin\phi_{R0} \\ z_R = r_{xyz}\cos\theta_{max} \\ \phi_{R0} = \phi_R(y_{f0}) \end{array}\right\}\text{Right end-point}$$

Note that (21) implies:

$$x_L = -x_R$$

$$y_L = y_R$$

$$z_L = z_R \quad (26)$$

From left-right symmetry about the y axis, the center of the pixel row (and for all rows) is mapped to the x=0 partial ellipse on the ellipsoid; which will give a function $\theta(y_f)$. This map is mapping of the pixel column: $x_f = W_1/2$, and will be referred to as the polar map. Mapping the row centers to the x=0 curve is consistent with the boundary map, which maps the centers of the top and bottom rows to the points $(\theta=\theta_{max}, \varphi=\pi/2)$ and $(\theta=\theta_{max}, \varphi=-\pi/2)$ respectively on the x=0 curve. As for the boundary maps, an arbitrary monotonic map can be used. An example linear polar map is given by:

$$\text{For top half } y_f \leq \frac{H_1}{2}: \phi = \frac{\pi}{2}, \theta = \theta_T(y_f) = \theta_{max}\left(1 - \frac{2y_f}{H_1}\right) \quad (27)$$

$$\text{For bottom half } y_f > \frac{H_1}{2}: \phi = -\frac{\pi}{2}, \theta = \theta_B(y_f) = \theta_{max}\left(1 - \frac{2y_f}{H_1}\right)$$

This map is continuous with the boundary maps described above, and maps the center of the image to the ellipsoid pole on the +z axis. On the y-z plane, it is convenient to define an azimuthal angle γ taken from the +y axis, with positive towards the +z axis. This angle is related to θ by:

$$\gamma = \frac{\pi}{2} - (\text{sgn}\phi) \times \theta \quad (28)$$

$$\text{sgn}\phi \equiv \begin{cases} +1, & \phi \geq 0 \\ -1, & \phi < 0 \end{cases}$$

The angle γ has a range of $[\pi/2-\theta_{max}, \pi/2+\theta_{max}]$. From (22) and (28), the coordinates on the envelope for the center vertical line (i.e. the pixel row centers) is given by:

$$x=0$$

$$y=r_{yz}\cos\gamma$$

$$z=r_{yz}\sin\gamma \quad (29)$$

Note that this is the x=0 curve on the ellipsoid, hence x=0. The y-z plane distance from the center $r_{yz}$ is again not constant as for a sphere; instead it is computed from (17) to be a function of $\gamma$:

$$r_{yz} = \frac{r_y r_z}{\sqrt{D_{yz}}} \qquad (30)$$
$$D_{yz} = r_y^2 \sin^2\gamma + r_z^2 \cos^2\gamma$$

Figure 13:
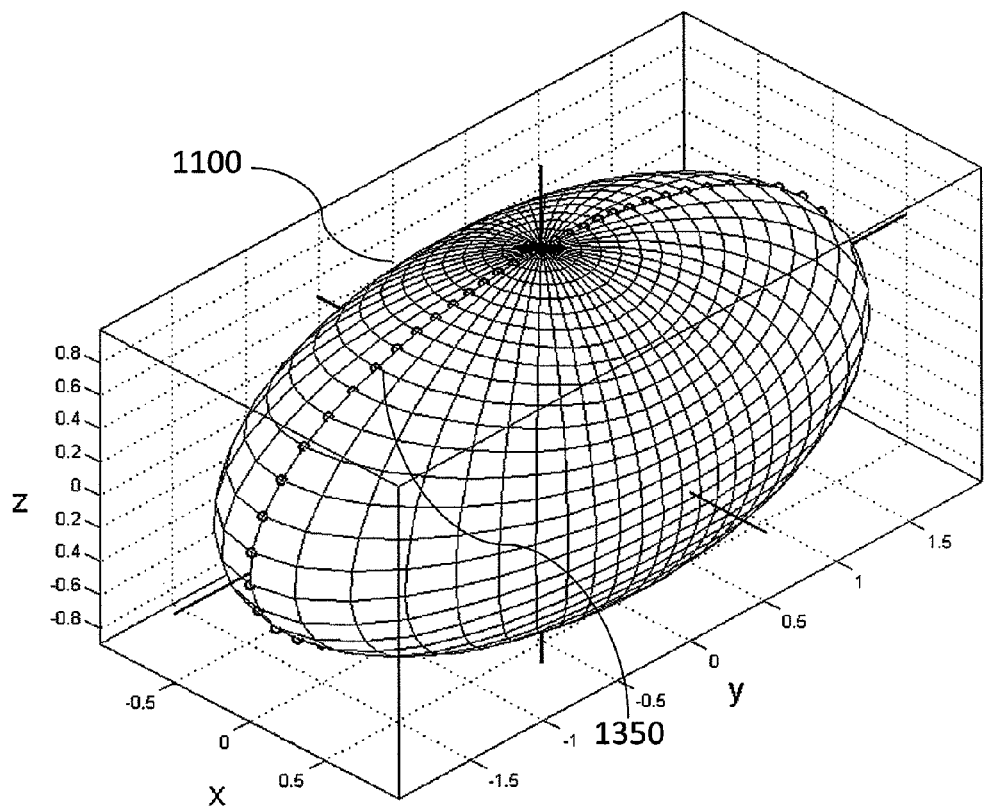
FIG. 13 illustrates mapping of the center column of pixels from the output image plane to the FOV-envelope.

The points on the envelope corresponding to the row centers will be denoted as $(x_C, y_C, z_C)$. FIG. 13 shows the polar map for a set of points 1350, corresponding to center points on the output image.

The computations have thus provided three points on the envelope for every pixel row, corresponding to the left/right end-points and the center:

$$\vec{x}_L = (x_L, y_L, z_L)$$

$$\vec{x}_R = (x_R, y_R, z_R)$$

$$\vec{x}_C = (x_C, y_C, z_C) \qquad (31)$$

The remaining row points can now be mapped by any well-behaved curve lying on the ellipsoid envelope interpolating these three points. We refer to these curves as the row mapping curves or the row mapping. A well-behaved means any curve that maintains the geometry of the pixel-row, in particular the curve should be mathematically smooth and the totality of all the curves (for all pixel rows) should form a smooth surface covering the ellipsoid. This is a general statement that provides extensive flexibility for varying the envelope transform.

Figure 14:
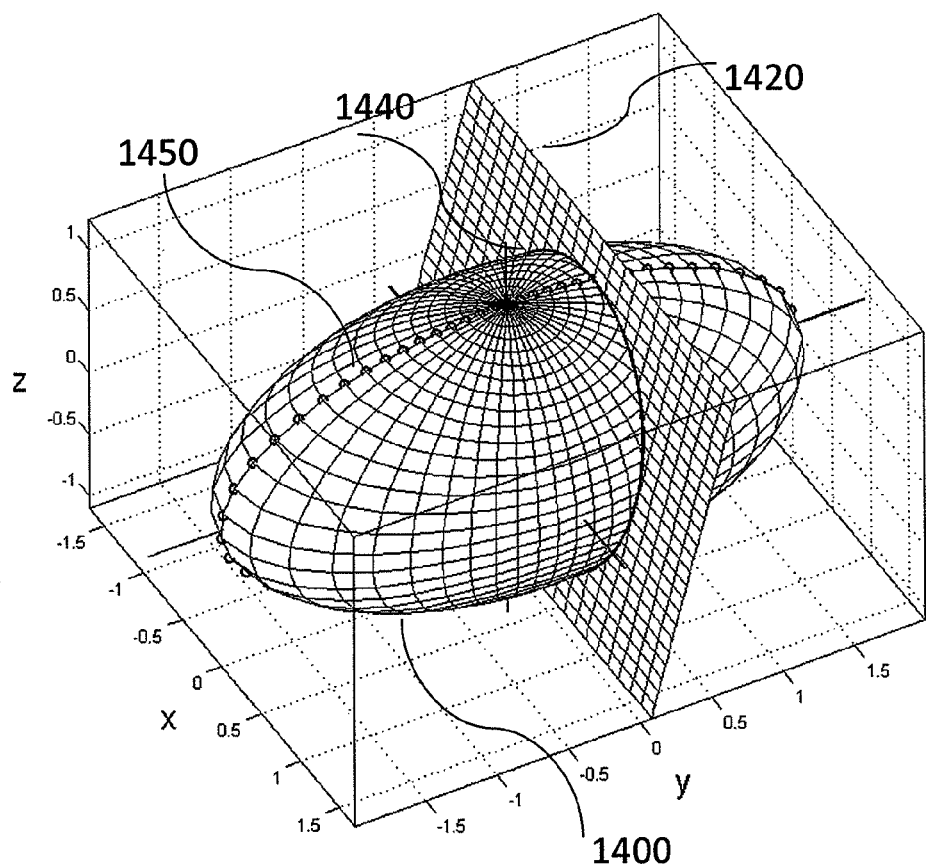
FIG. 14 illustrates a plane uniquely defined by mapping of two boundary points and one inside point from a row of the output image.

Referring to FIG. 14, as a specific example, we take the curves to be defined by the intersection of the planes 1420, uniquely determined by the three points in (31), with the ellipsoid 1400. In this scenario, the row mapping curves will be an ellipse 1440 wrapping around the ellipsoid, as seen in FIG. 14. The condition of smoothness is automatically attained by the smoothness of the ellipses that result from intersecting planes with an ellipsoid. The uniqueness of the three points for each row also ensures that each such plane is unique. The explicit determination of the curves is discussed next for this example.

The points (31) lie on the ellipsoid as well as the intersecting plane. This leads to various constraints that simplify the construction. The normal to the plane, $\vec{n} = (n_x, n_y, n_z)$, can be computed from the points (31) to be:

$$\vec{v}_1 \equiv \vec{x}_R - \vec{x}_C \qquad (32)$$
$$\vec{v}_2 \equiv \vec{x}_L - \vec{x}_C$$
$$\vec{n} = \frac{\vec{v}_2 \times \vec{v}_1}{\|\vec{v}_2 \times \vec{v}_1\|}$$

Using (26) in (32) it can be shown that $n_x = 0$. A vector from $\vec{x}_C$ to any point $(x,y,z)$ on the curve must be perpendicular to the normal since it lies on the intersecting plane:

$$(x - x_C, y - y_C, z - z_C) \cdot (0, n_y, n_z) = 0 \qquad (33)$$

This leads to a relation between y and z on the curve:

$$z = -(y - y_C)\frac{n_y}{n_z} + z_C \qquad (34)$$

The special case of $n_x = 0$ needs to be handled separately; however in this case the ellipse lies completely in the x-z plane and can be easily determined from the 2D ellipse equation and the points (31). Explicitly one finds for (34):

$$z(y) = I(y + J) \qquad (35)$$

$$I \equiv \frac{r_{xyz} \cos\theta_{max} - r_{yz}\sin\gamma}{r_{xyz}\cos\psi\sin\theta_{max} - r_{yz}\sin\gamma}$$

$$J \equiv -r_{yz}\cos\gamma + \frac{r_{yz}\sin\gamma}{I}$$

$$\psi \equiv \phi_L(y_f) - \frac{\pi}{2} = \psi_0 + 2\left(\frac{\pi}{2} - \psi_0\right)\frac{y_f}{H_1}$$

The equation of the ellipsoid (17) can be used in turn to determine y as a function of x. Substituting (35), equation (17) becomes:

$$\frac{x^2}{r_x^2} + \frac{y^2}{r_y^2} + \frac{(I(y+J))^2}{r_z^2} = 1 \qquad (36)$$

Solving (36) gives:

$$y(x) = \frac{-b_y \pm \sqrt{b_y^2 - 4a_y c_y}}{2a_y} \qquad (37)$$

$$a_y = \frac{1}{r_y^2} + \frac{I^2}{r_z^2}, \; b_y = 2\frac{I^2 J}{r_z^2}, \; c_y = \frac{x^2}{r_x^2} + \frac{I^2 J^2}{r_z^2} - 1$$

The intersection ellipse is now completely determined by (35) and (37) in terms of x. The range of x is between the end-points of the ellipse:

$$x_L \leq x \leq x_R \qquad (38)$$

Recall that the end-points on the ellipse are mapped to the end-points of the pixel row.

It remains to map $0 \leq x_f \leq W_1$, the pixels along a given row in the output, to (38). Any monotonic smooth function can be used, such as a simple linear map:

$$x = x_L + (x_R - x_L)\frac{x_f}{W_1} \qquad (39)$$

Different functions lead to different local scaling along the x direction. In one exemplary embodiment, another approach is outlined based on traversing equal distances on the envelope, which is similar to the relation (12) for cylindrical projections, though the mathematics is complicated by the non-spherical envelope. On the intersecting plane 1420, the curves 1440 are standard ellipses. Therefore the curves can be analyzed by going to a rectangular two-dimensional coordinate system, $\tilde{x}, \tilde{y}$, defined on this plane 1420. In addition, because there is no scaling involved in moving to the coordinate system, all distances are maintained. Define the $\tilde{y}$-axis to be going through the point $\vec{x}_C$ and perpendicular to the line segment through: $\vec{x}_L \vec{x}_R$, with positive direction determined by the sign of $y_C$. This is the line that sits in the ellipsoid y-z plane. Note the line segment $\vec{x}_L \vec{x}_R$ also lies in the intersection plane. The x̃-axis can be chosen either (a) to be such that the ellipse origin is at the center, or (b) along the $\vec{x}_L \vec{x}_R$ line segment. The ellipse equation for these two cases takes the form:

$$\frac{\tilde{x}^2}{\tilde{r}_x^2} + \frac{\tilde{y}^2}{\tilde{r}_y^2} = 1 \quad (a) \tag{40}$$

$$\frac{\tilde{x}^2}{\tilde{r}_x^2} + \frac{(\tilde{y}-b_e)^2}{\tilde{r}_y^2} = 1 \quad (b)$$

The two differ only by a shift $b_e$. Additional points can be computed on the ellipse by using the fact that in the x-y-z system, these points must satisfy the ellipsoid equation. In particular, for case (b) we can compute the intercepts with the ỹ-axis. One of the intercepts is associated with the point $\vec{x}_C$, which will be denoted $y_1$, and the other opposite intercept denoted $y_2$. Also in case (b), the intercepts along the x̃-axis axis are found to be $-x_R$ (negative) and $x_R$ (positive). In terms of the intercepts the unknown quantities in (40) can be written as:

$$b_e = \frac{y_1 + y_2}{2} \tag{41}$$

$$\tilde{r}_y = \left|\frac{y_1 - y_2}{2}\right|$$

$$\tilde{r}_x = \sqrt{x_R^2 \left(1 - \frac{b_e^2}{\tilde{r}_y^2}\right)^{-1}}$$

These quantities can be used to determine the arc-length of the ellipse (of the part on the ellipsoid). The arc-length $s_{arc}$ is more easily computed in the coordinate system (a), and takes the form:

$$s_{arc} = 2\int_{\overline{\alpha}_0}^{\frac{\pi}{2}} \tilde{r}_{xy}(\overline{\alpha}) d\overline{\alpha} \tag{42}$$

$$\tilde{r}_{xy}(\overline{\alpha}) = \frac{\tilde{r}_x \tilde{r}_y}{\sqrt{\tilde{r}_y^2 \cos^2\overline{\alpha} + \tilde{r}_x^2 \sin^2\overline{\alpha}}}$$

$$\overline{\alpha}_0 = -\text{sgn}(y_1)\text{sgn}(b_e)\arctan\left(\frac{|b_e|}{x_R}\right)$$

Here $\overline{\alpha}$ is the standard polar angle in the x̃-ỹ plane. Equation (42) gives the length of the curve on the ellipsoid corresponding to a specific pixel row. We select a mapping from $x_f$ to x, such that an equal change in $x_f$ corresponds to an equal traversed arc-length on the ellipse. This is achieved by finding for every $x_f$ an angle $\overline{\alpha}_x$ that satisfies:

$$x_f \frac{s_{arc}}{W_1} = -\int_{\pi - \overline{\alpha}_0}^{\overline{\alpha}_x} \tilde{r}_{xy}(\overline{\alpha}) d\overline{\alpha} \tag{43}$$

The negative sign and shift of the lower limit is required by the ordering of $x_f$, namely as $x_f$ increases, $\overline{\alpha}_x$ decreases. This provides $\overline{\alpha}_x$ as a function of $x_f$, analogous to (12) for the cylindrical projection, which in turn gives the required $x_f$ to x map via:

$$x = \tilde{r}_{xy}(\overline{\alpha}_x(x_f)) \times \cos(\overline{\alpha}_x(x_f)) \tag{44}$$

Note that the integrals (42) and (43) can be computed numerically using well known techniques, such as the quadrature method. Equations (35), (37) and (44), along with the maps (20) and (27), give the final envelope transform, mapping the output image to a general ellipsoid envelope.

The envelope boundary, defined by $\theta_{max}$, has been taken to be independent of $\varphi$. However, the method disclosed is equally applicable to having $\theta_{max}(\varphi)$ depend on $\varphi$ as in (6). The main difference being that the constant $\theta_{max}$ needs to be replaced by $\theta_{max}(\varphi)$, with $\varphi$ first determined by the boundary maps. Another subtle issue for ellipsoid envelopes is that the envelope boundary may not lie in a plane, whereas the row mapping curves (ellipses) are planar. As the ellipses approach the top/bottom e-boundaries, they need to smoothly join to the boundary curves. This can be handled by generating the ellipses from a few rows below and above the top and bottom pixels rows respectively, which are then interpolated with the boundary curves over the remaining rows. This is not an issue for spherical envelopes, where the envelope boundary is planar.

Figure 15:
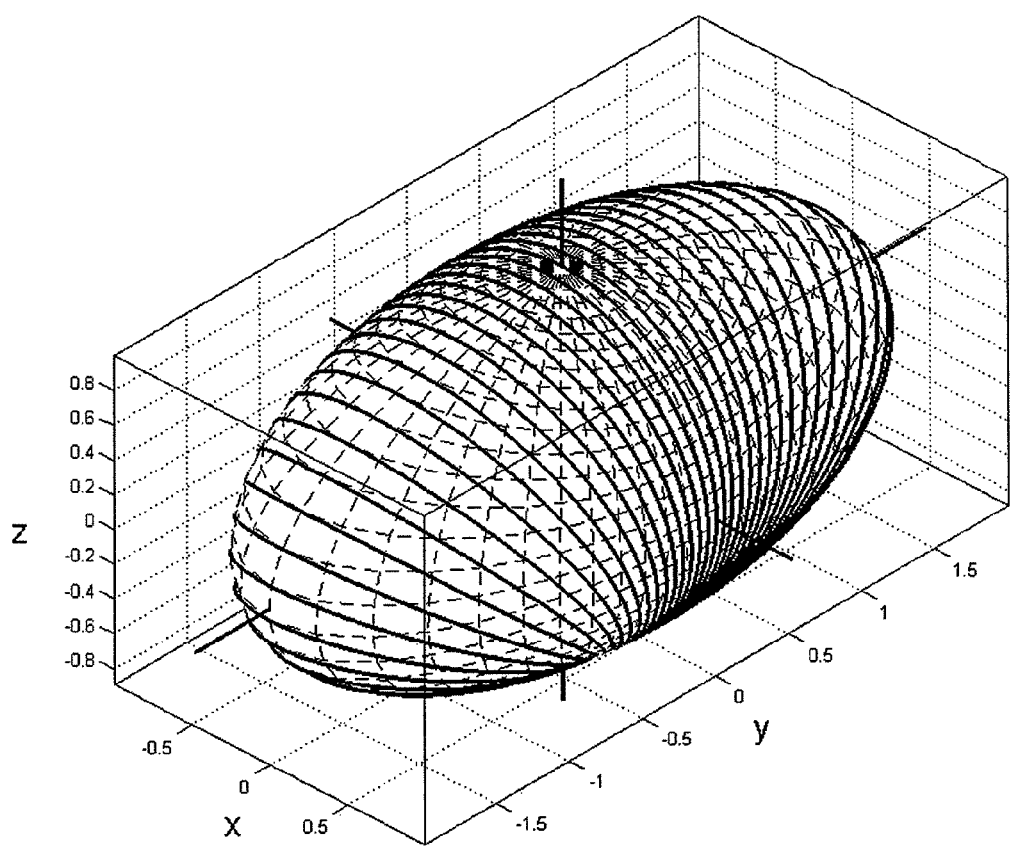
FIG. 15 illustrates an exemplary envelope transformation for a 270° UWA lens for a set of points on the output image.
Figure 16:
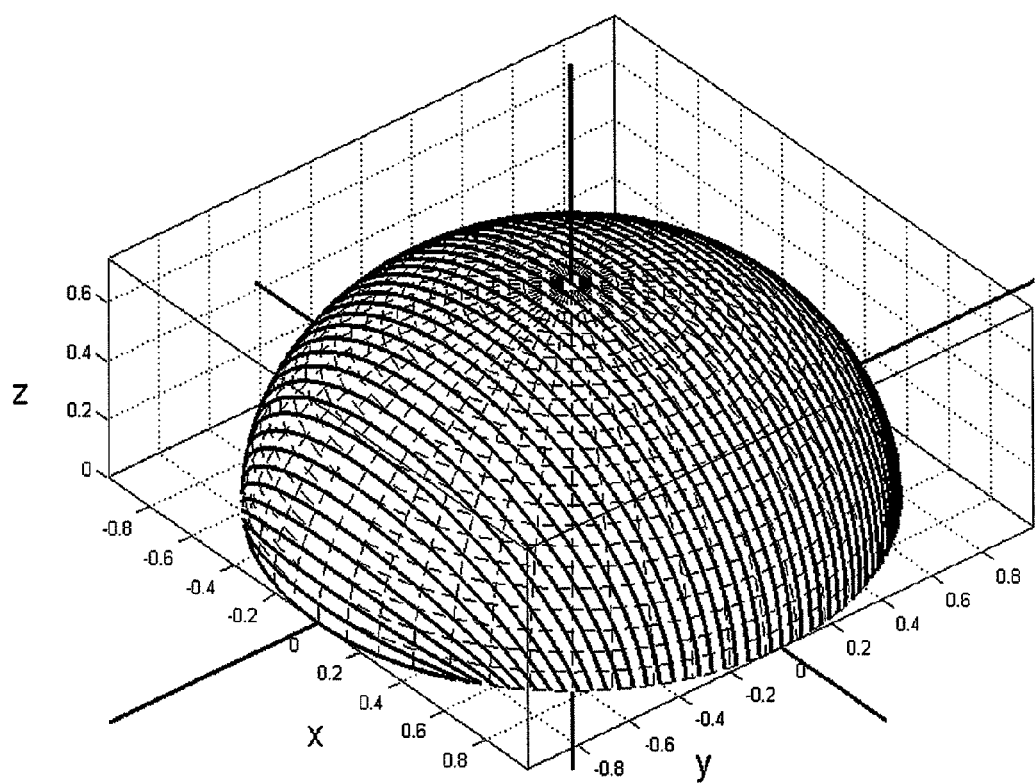
FIG. 16 illustrates an exemplary envelope transformation for a 180° UWA lens for a set of points on the output image.

The above method includes several parameters or means for customization:
 I. Ellipsoid semi-axes lengths: $r_x, r_y, r_z$
 II. Boundary partition angle: $\psi_0$
 III. Boundary maps: $\varphi_T(x_f), \varphi_B(x_f), \varphi_L(y_f), \varphi_R(y_f)$
 IV. Polar maps: $\theta_T(y_f), \theta_B(y_f)$
 V. Row mapping curves: $(x_f, y_f, z_f) \rightarrow (x, y, z)$ for pixel rows This provides extensive flexibility for modifying the transform to develop different types of ZCL corrections. Envelope transforms for a 270° and 180° UWA lens are shown in FIGS. 15 and 16 for a set of points on the output image. For both cases, the specific maps developed above ((20), (27), (35), (37) and (44)) were used, with the parameters set as:

$$270°: r_x = r_z = 1, r_y = 2, \psi_0 = \frac{\pi}{6}$$

$$180°: r_x = r_y = 1, r_z = 0.75, \psi_0 = \frac{\pi}{6}$$

Both cases use an ellipsoid envelope, with the second case being closer to a spherical envelope.

The zero-content-loss correction transformation is again built by combining the envelope mapping with the lens mapping. As mentioned before, computing the envelope transform requires no knowledge of the lens mapping. The only information required from the lens was its field of view characterization, or $\theta_{max}$, and that it be a conical-UWA lens. This implies that the same envelope transform can be used for a circular and a non-circular UWA lens; provided they have the same $\theta_{max}$ value. In other words, the method is independent of the imaging behavior of the lens. This also means that distortions introduced during the manufacturing of UWA lenses or from other sources, causing non-ideal behavior for that lens, can be accounted for provided they are characterized in the lens mapping equation. For the lens mapping equation (4), the zero-content-loss correction becomes:

$$u = \alpha\theta\cos\phi \tag{45}$$

$$v = \alpha\theta\sin\phi$$

-continued $$\alpha = R_l \theta_{max}^{-1}, R_l \text{ radius of lens image}$$

$$\theta(x, y, z) = \arccos \frac{z}{\sqrt{x^2 + y^2 + z^2}}, \phi(x, y, z) = \arctan\left(\frac{y}{x}\right)$$

$$x(x_f) = \tilde{r}_{xy}(\overline{\alpha}_x(x_f)) \times \cos(\overline{\alpha}_x(x_f))$$

$$y(x) = \frac{-b_y \pm \sqrt{b_y^2 - 4a_y c_y}}{2a_y}$$

$$z(y) = I(y + J)$$

Figure 18:
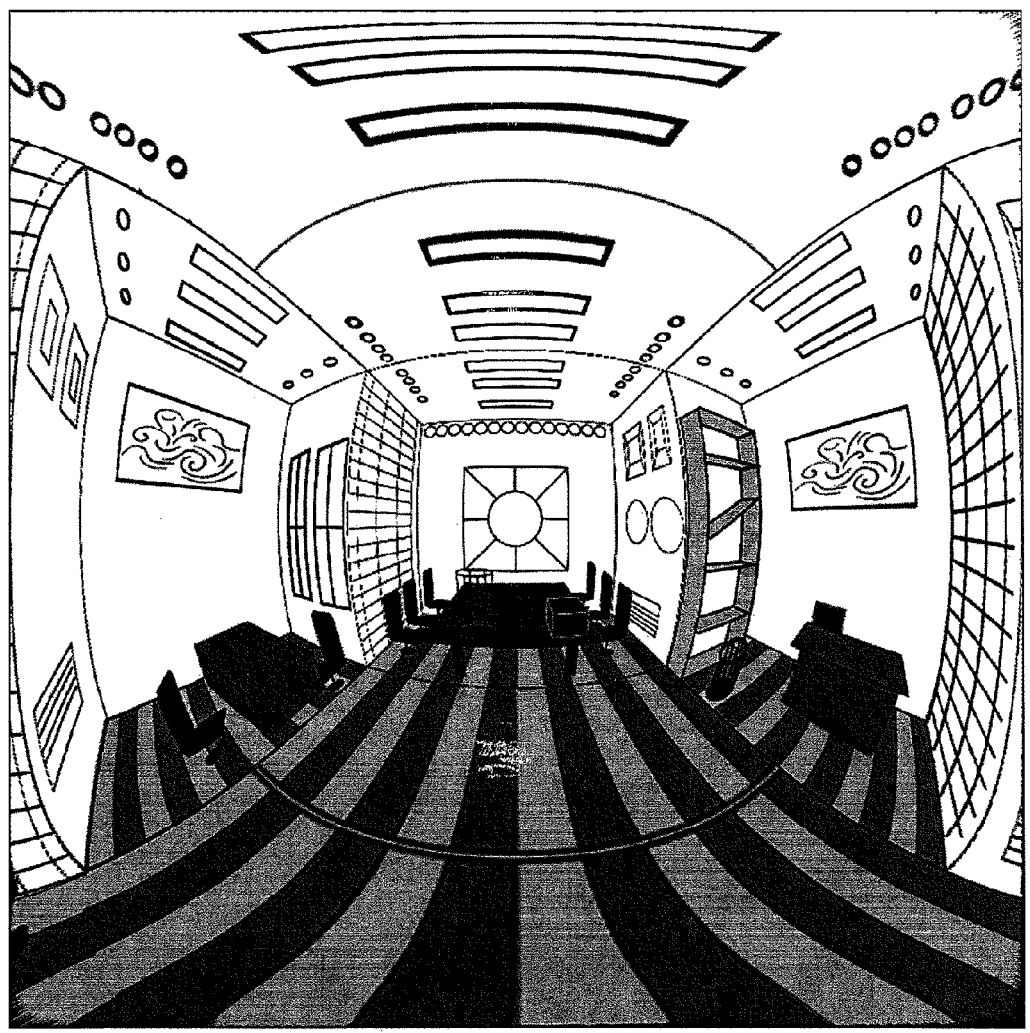
FIG. 18 illustrates a result of a zero-content-loss transformation applied to the input image of FIG. 7 using an exemplary ZCL mapping.
Figure 19:
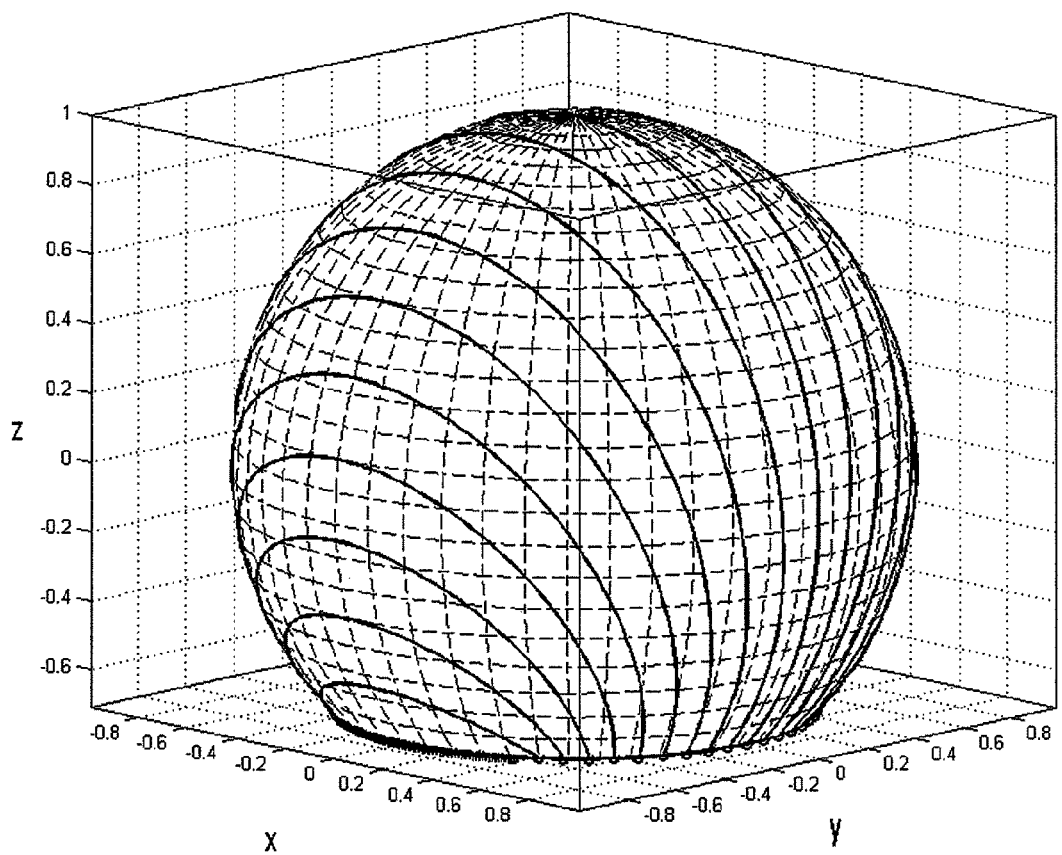
FIG. 19 illustrates a spherical envelope with the overlaying envelope mapping for a 270° UWA lens.

Only the main equations are listed in (45). Applying (45), with the 180° envelope transform (see FIG. 16) settings to the input image of FIG. 6, gives the output image shown in FIG. 17. All content in the original UWA image of FIG. 6 is visible in this correction, which further validates the method as generating ZCL images. The overall perspective is substantially improved giving the impression of a standard (SLR) camera picture. The improvements over the cylindrical projection results in FIGS. 8 to 10 are clearly seen. At the poles, perspective is recovered very well, with no infinite stretching. This is very apparent in the carpet, where no tearing is seen. The curved vertical object lines in the UWA image are almost completely straightened (as needed for perspective) without excessively curving the diagonal object lines. This maintains the perspective towards the left and right rooms to a much higher degree. The ceiling diagonals are kept diagonal. The rooms do not appear, as they did in the cylindrical projection, to lie along a line, but maintain their left right viewpoints to a much higher degree. Objects in the in the center one-third of the corrected image, such as the central room, shelves, paintings, vents, chairs, have better perspective in comparison with the UWA image. These improvements in the center, which is the most important part of the image, do not come at the expense of losing any content. This is very critical for security applications, where movements in the full view need to be monitored, even though the main focus may be in the middle of the view. FIG. 18 shows the ZCL image for the 270° UWA lens input image of FIG. 7. Here a spherical envelope was used with the envelope mapping shown in FIG. 19; wherein again a much improved perspective is seen, considering such a wide FOV with large parts of the image coming from objects behind the camera. The ZCL image preserves all content, straightening object lines near the circumference without blowing up the poles, to provide an image much closer to a standard camera.

Figure 20:
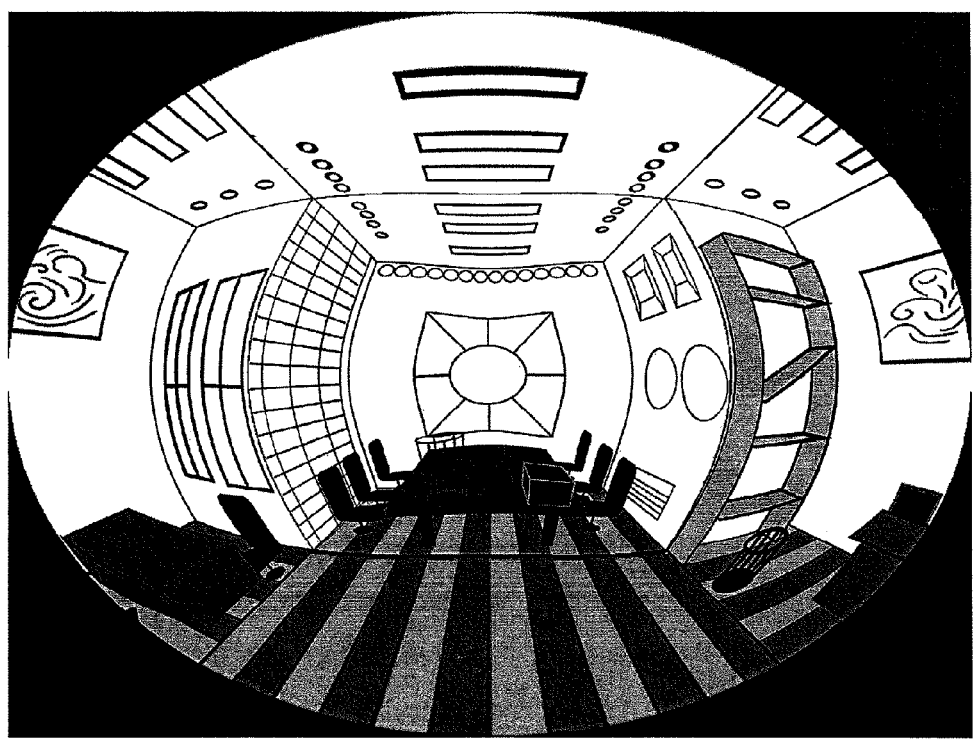
FIG. 20 illustrates a simulated image from a UWA lens wherein the captured input image is an ellipse.

By varying the envelope parameters, variations of the correction can be made, including obtaining ZCL images which allow panoramic stitching, without "blowing up" the poles. The transformations obtained using cylindrical projection can also be recovered with an appropriate choice of parameters. Thus the zero-content-loss images of FIGS. 8 and 9 can be viewed as specific cases of the general ellipsoid construction above. In particular, to recover FIG. 9, one takes $\psi_0 = 0$. Furthermore, any UWA lens with the same $\theta_{max}$, regardless of the captured image shape (circle, ellipse, etc.) can also be handled. FIG. 20 shows a simulated image from UWA lens whose image appears as an ellipse. Such UWA lenses have the benefit of covering more of the sensor, which is more commonly rectangular than a square. This provides more input pixels containing image data and can lead to improved quality. In this case, the lens mapping equation (2) takes the form:

$$\phi' = \phi \quad (46)$$

$$r' = \alpha_e r_{exy} \theta$$

$$r_{exy} = \frac{r_{ex} r_{ey}}{\sqrt{r_{ex}^2 \sin^2\phi + r_{ey}^2 \cos^2\phi}}$$

Figure 17:
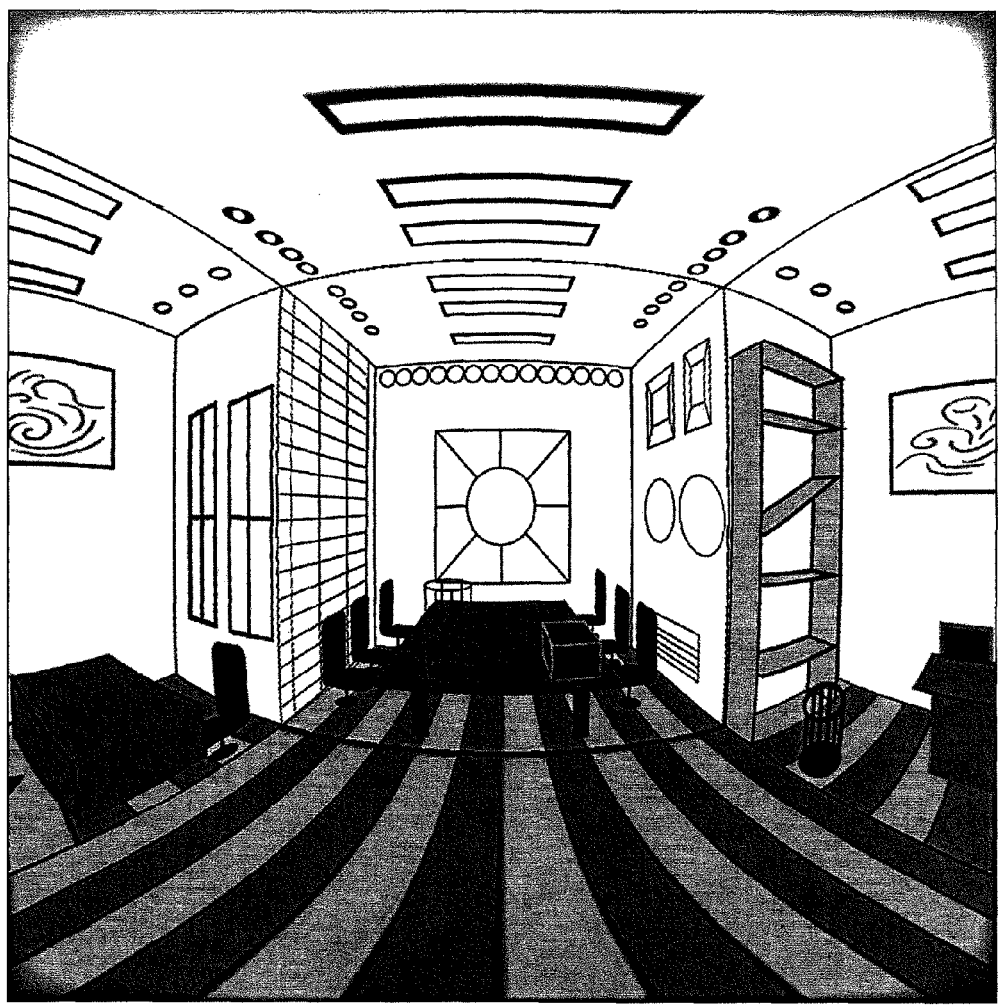
FIG. 17 illustrates a result of a zero-content-loss transformation applied to the input image of FIG. 6 using an exemplary ZCL mapping.

Using lens mapping of (46) (instead of (4)) in (45) leads to the same image as in FIG. 17. The ZCL framework disclosed supports all such more complicated lenses. As expected, there is some (residual) distortion remaining, with the perspective correction not exact, which is expected when mapping UWA views to 2D images. However, the residual distortion can be selectively eliminated in regions of interest within the ZCL framework, as outlined below.

According to an embodiment of the invention, the full view ZCL correction can be combined with local exact perspective corrections. As mentioned in regard to standard non-wide angle lens cameras, the basic envelope for a standard perspective camera is a plane encompassing the FOV, and perpendicular to the optical axis. The associated envelope transform is a linear mapping of the 2D output image coordinates to the 2D coordinates on the envelope plane. This suggests that to obtain local perspective correction for a UWA lens, along a specific direction specified by $(\theta_{p1}, \varphi_{p1})$, the envelope locally needs to be a plane perpendicular to the axis through $(\theta_{p1}, \varphi_{p1})$. To maintain the ZCL correction away from the $(\theta_{p1}, \varphi_{p1})$ neighborhood, the envelope should remain an ellipsoid, with the transition being smooth. Accordingly, the method for local perspective correction consists of smoothly stitching the two envelopes (ellipsoid and plane) and their transformations together in the region of interest, and retaining the ZCL transformation outside the region of interest. Let $\vec{F}_{e1}$ and $\vec{F}_{e2}$ be two envelope transformations defined over $(x_f, y_f)$, mapping $(x_f, y_f)$ to $(x,y,z)$. (For the local perspective correction formulation, we take the origin in $(x_f, y_f)$ to be the center of the image, with positive to the right and the top.) The full $(x_f, y_f)$ domain will be denoted $A_D$. The domain is split into three disjoint sections: a region of interest $A_I$, a transition region $A_T$ surrounding $A_I$, and a base region $A_B$ containing all points not in $A_I$ or $A_T$. The stitching builds a new envelope transform $\vec{F}_{es}$, that is identical to $\vec{F}_{e1}$ on $A_B$, identical to $\vec{F}_{e2}$ on $A_I$, and interpolates between $\vec{F}_{e1}$ and $\vec{F}_{e2}$ on $A_T$. This is described by the following equation:

$$(x_f, y_f) \in A_D = A_B \cup A_T \cup A_I \quad (47)$$

$$(x, y, z) = \vec{F}_{es}(x_f, y_f)$$

$$\vec{F}_{es}(x_f, y_f) = \begin{cases} \vec{F}_{e1}(x_f, y_f), & \text{if } (x_f, y_f) \in A_B \\ \vec{F}_{e2}(x_f, y_f), & \text{if } (x_f, y_f) \in A_I \\ f_1(x_f, y_f)\vec{F}_{e1}(x_f, y_f) + f_2(x_f, y_f)\vec{F}_{e1}(x_f, y_f), & \text{if } (x_f, y_f) \in A_T \end{cases}$$

where $f_1, f_2$ are appropriate interpolating functions, which we take as scalar functions. Note since the definition of the envelop transform includes a defining envelope, equation (47) implicitly defines the new stitched envelope. It is also useful to define the regions in the (x,y,z) space via a global transformation from $(x_f, y_f)$ to $(x,y,z)$. If $\vec{G}(x_f, y_f)$ is such a globally defined map, the regions and stitching takes the form:

$$(x, y, z) \in \overline{A}_D = \overline{A}_B \cup \overline{A}_T \cup \overline{A}_I \quad (48)$$

$$(x, y, z) = \vec{F}_{es}(x_f, y_f)$$

$$\vec{F}_{es}(x_f, y_f) =$$

$$\begin{cases} \vec{F}_{e1}(x_f, y_f), & \text{if } \vec{G}(x_f, y_f) \in \overline{A}_B \\ \vec{F}_{e2}(x_f, y_f), & \text{if } \vec{G}(x_f, y_f) \in \overline{A}_I \\ f_1(x_f, y_f)\vec{F}_{e1}(x_f, y_f) + f_2(x_f, y_f)\vec{F}_{e1}(x_f, y_f), & \text{if } \vec{G}(x_f, y_f) \in \overline{A}_T \end{cases}$$

Here the bar distinguishes the two approaches. This stitching can be viewed as moving the pixels in the region of interest to recover perspective, which in turn twists and distorts the pixels in the transition region, and retaining the original ZCL correction in the base region. Thus we push the residual distortions out of the region of interest to the transition region. The function $\vec{F}_{e1}$ becomes the ZCL envelope transform (45), which is re-written as:

$$\vec{F}_{e1}(x_f, y_f) = \begin{bmatrix} x \\ y \\ z \end{bmatrix} = \begin{bmatrix} \tilde{r}_{xy}(\overline{\alpha}_x(x_f)) \times \cos(\overline{\alpha}_x(x_f)) \\ \frac{-b_y \pm \sqrt{b_y^2 - 4a_y c_y}}{2a_y} \\ I(y + J) \end{bmatrix} \quad (49)$$

The function $\vec{F}_{e2}$ is taken as the perspective envelope transform, which is constructed below.

To construct the perspective envelope transform, we first take the +z-axis as the optical axis ($\theta_{p1}=0, \varphi_{p1}=0$) for simplifying the construction. In this case the envelope would be the plane at $z=z_{m1}$, which is orthogonal to the z-axis. By varying $z_{m1}$, the amount of magnification can be changed, hence the z position is kept variable. Corresponding to the direction ($\theta_{p1}, \varphi_{p1}$), we can associate the unique point in the output image coordinate space $(x_f, y_f)$, denoted $(x_{fp1}, y_{fp1})$, to which that direction is mapped under the ZCL envelope transform (45). By definition of the envelop transform this point exists and can be computed from (45). The point $(x_{fp1}, y_{fp1})$ is the center of the region of interest $A_I$, about which local perspective correction is required. Knowing $(\theta_{p1}, \varphi_{p1})$, $(x_{fp1}, y_{fp1})$ can be computed and vice-versa. With these definitions, the perspective envelope transform about $(\theta_{p1}=0, \varphi_{p1}=0)$ can be written as:

$$x = s_x(x_f - x_{fp1}) \quad (50)$$
$$y = s_y(y_f - y_{fp1})$$
$$z = z_{m1}$$
$$s_x = s_y = \frac{z_{m1}\tan(\theta_{pFOV})}{l_p}$$

The scale factors $(s_x, s_y)$ are shown determined by the perspective field of view $2'_{pFOV}$, and the size $l_p$, of the perspective corrected region in $(x_f, y_f)$. The perspective envelope transform about an arbitrary direction $(\theta_{p1}, \varphi_{p1}) \neq (0,0)$, can be computed by rotating (50). To bring the (0, 0) direction to an arbitrary $(\theta_{p1}, \varphi_{p1})$ direction, a rotation of $\pm \theta_{p1}$ degrees about the negative y-axis (i.e. $\theta_{p1}$ degrees counter-clockwise in the xz-plane, when viewed from the negative y-axis) followed by a rotation of $\overline{\varphi}_{p1}$ about the positive z-axis, is used. Here $\overline{\varphi}_{p1}$ is the equivalent of $\varphi_{p1}$, when measured from the positive or negative x-axis such that $-\pi/2 \leq \overline{\varphi}_{p1} \leq \pi/2$. If $-\pi/2 \leq \varphi_{p1} \leq \pi/2$, the negative sign for $\theta_{p1}$ is used, otherwise the positive. We also include an initial rotation of $\varphi_{0p1}$ about the positive z-axis, to allow rotating the perspective correction in order to get better alignment (mathematical smoothness) within the surrounding zero-content-loss correction. The final perspective envelope transformation takes the form:

$$\vec{F}_{e2}(x_f, y_f) = \begin{bmatrix} x \\ y \\ z \end{bmatrix} = R(\phi_{0p1}, \theta_{p1}, \phi_{p1}) \begin{bmatrix} s_x(x_f - x_{fp1}) \\ s_y(y_f - y_{fp1}) \\ z_{m1} \end{bmatrix} \quad (51)$$

$$R(\phi_{0p1}, \theta_{p1}, \phi_{p1}) = R_z(\overline{\phi}_{p1})R_y(\pm \theta_{p1})R_z(\phi_{0p1})$$

$$\overline{\phi}_{p1} = \begin{cases} \phi_{p1}, & \text{if } -\pi/2 \leq \phi_{p1} \leq \pi/2 \\ \phi_{p1} - \pi, & \text{if } \pi/2 \leq \phi_{p1} \leq 3\pi/2 \end{cases}$$

$$R_y(\theta) = \begin{bmatrix} \cos(\theta) & 0 & -\sin(\theta) \\ 0 & 1 & 0 \\ \sin(\theta) & 0 & \cos(\theta) \end{bmatrix}$$

$$R_z(\theta) = \begin{bmatrix} \cos(\theta) & -\sin(\theta) & 0 \\ \sin(\theta) & \cos(\theta) & 0 \\ 0 & 0 & 1 \end{bmatrix}$$

Figure 21A:
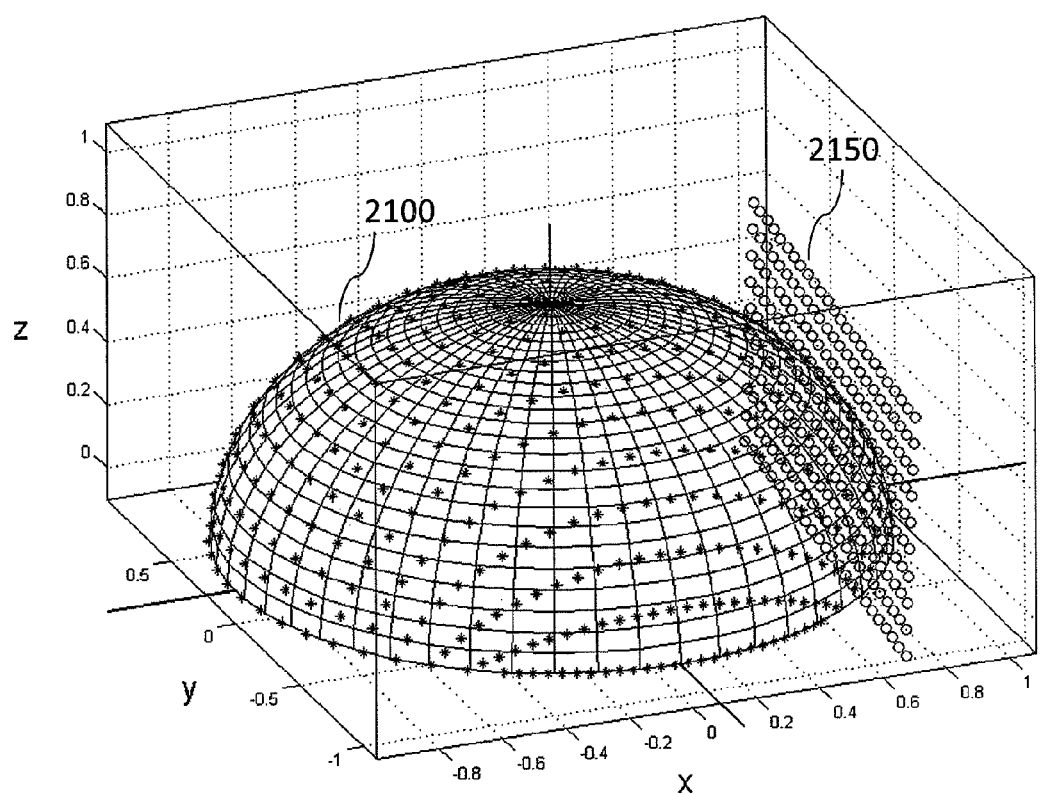
FIG. 21a illustrates an ZCL envelope mapping for a 180° UWA lens, and a perspective envelope mapping for a specific region of interest.

The angle $\varphi_{0p1}$ can be adjusted to control amount of "twisting" in the transition region; normally a value of $\varphi_{0p1} \approx -\varphi_{p1}$ gives good results. FIG. 21a shows the two envelop transforms, the ZCL ellipsoid 2100 and perspective plane 2150, about a direction of $(\theta_{p1}=65°, \varphi_{p1}=-35°)$. It remains to define the regions and compute the stitching.

For UWA lenses with a conical FOV defined by (6), it is natural to use circular regions of interest about a given direction in the $(x,y,z)$ space. The reason being that the $(x,y,z)$ space gives the real world direction in which the lens is capturing, along which a perspective view is sought. These circular regions are basically the intersection of a cone of some angle with the perspective envelope plane. Using (48) and (50), the circular region of interest, and the transition and base regions, can be written as:

$$\begin{bmatrix} x \\ y \\ z \end{bmatrix} = \vec{G}(x_f, y_f) = \begin{bmatrix} s_x(x_f - x_{fp1}) \\ s_y(y_f - y_{fp1}) \\ 0 \end{bmatrix} \quad (52)$$

$$r \equiv \|\vec{G}(x_f, y_f)\|$$

$$\overline{A}_I : r \leq r_I$$

$$\overline{A}_T : r_I < r \leq r_T$$

$$\overline{A}_B : r_T < r$$

The rotation in (51) ensures that these regions are transformed to the correct circular regions in the required direction. The interpolation can now be done in r. As an example, a linear function combined with an adjustable exponent $\kappa_e$ is used for the interpolation. The final zero-content-loss envelop transform, with local perspective correction about $(\theta_{p1},\varphi_{p1})$, or equivalently $(,x_{fp1},y_{fp1})$, is:

$$\begin{bmatrix} x \\ y \\ z \end{bmatrix} = \vec{F}_{es}(x_f, y_f) = \qquad (53)$$

$$\begin{cases} \vec{F}_{e1}(x_f, y_f), & \text{if } r_T < r \\ \vec{F}_{e2}(x_f, y_f), & \text{if } r \leq r_I \\ f_1(x_f, y_f)\vec{F}_{e1}(x_f, y_f) + f_2(x_f, y_f)\vec{F}_{e2}(x_f, y_f), & \text{if } r_I < r \leq r_T \end{cases}$$

$$f_2(x_f, y_f) = \left(\frac{r_T - r}{r_T - r_I}\right)^{\kappa_e},$$

$$f_1(x_f, y_f) = 1 - f_2(x_f, y_f)$$

Figure 21B:
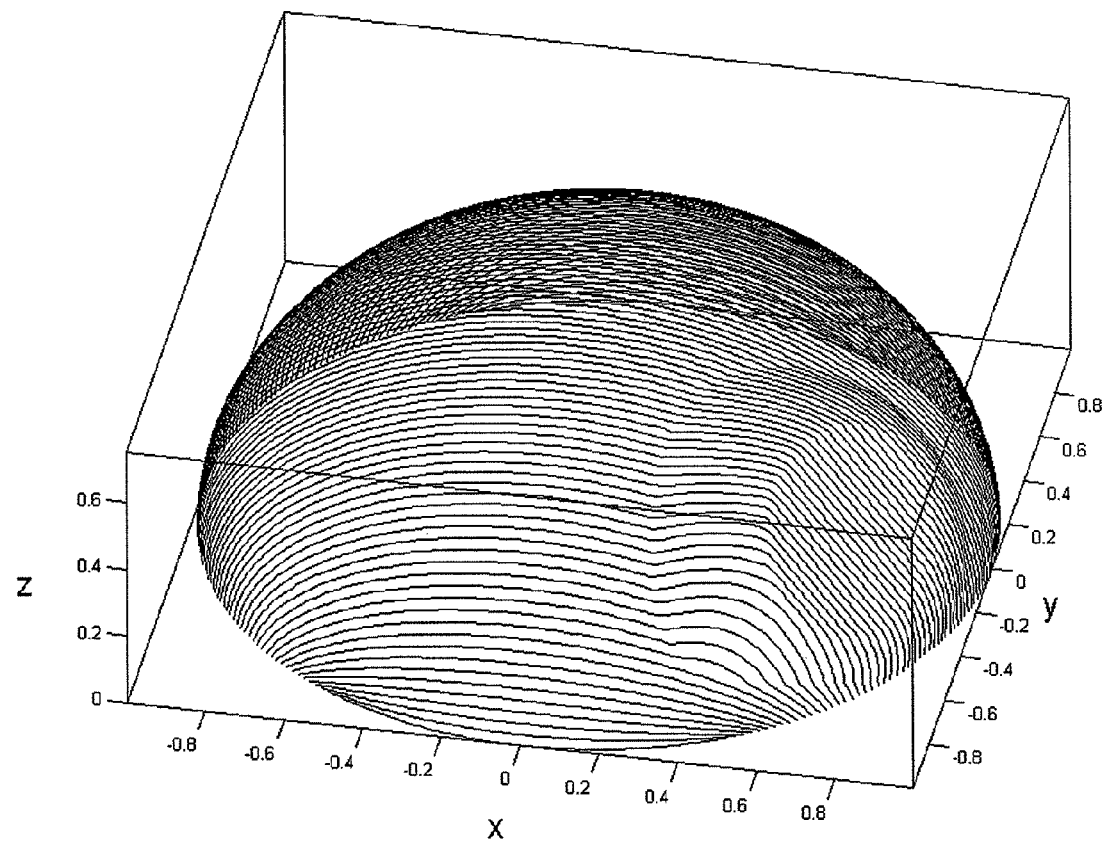

The two component transforms being, $\vec{F}_{e1}$ as in (45) and $\vec{F}_{e2}$ as in (51). FIG. 21b shows the resulting stitched envelope mapping. Lastly the ZCL correction with local perspective correction is obtained by applying the lens mapping equation (4) to (53), analogous to what was done in the first four equations of (45). About any direction, a local perspective adjustment can be made using the above approach. It is also possible to define multiple regions of interest where local perspective correction is needed. This is achieved by extending the stitching of (47) to include a union of all disjoint regions of interest, each with its own perspective planar envelope, and individually interpolated with the starting zero-content-loss envelope transform. An example of this is shown below. Hence, the method has provided a zero-content-loss correction that is locally-perspective-adaptive (LPA).

Figure 22:
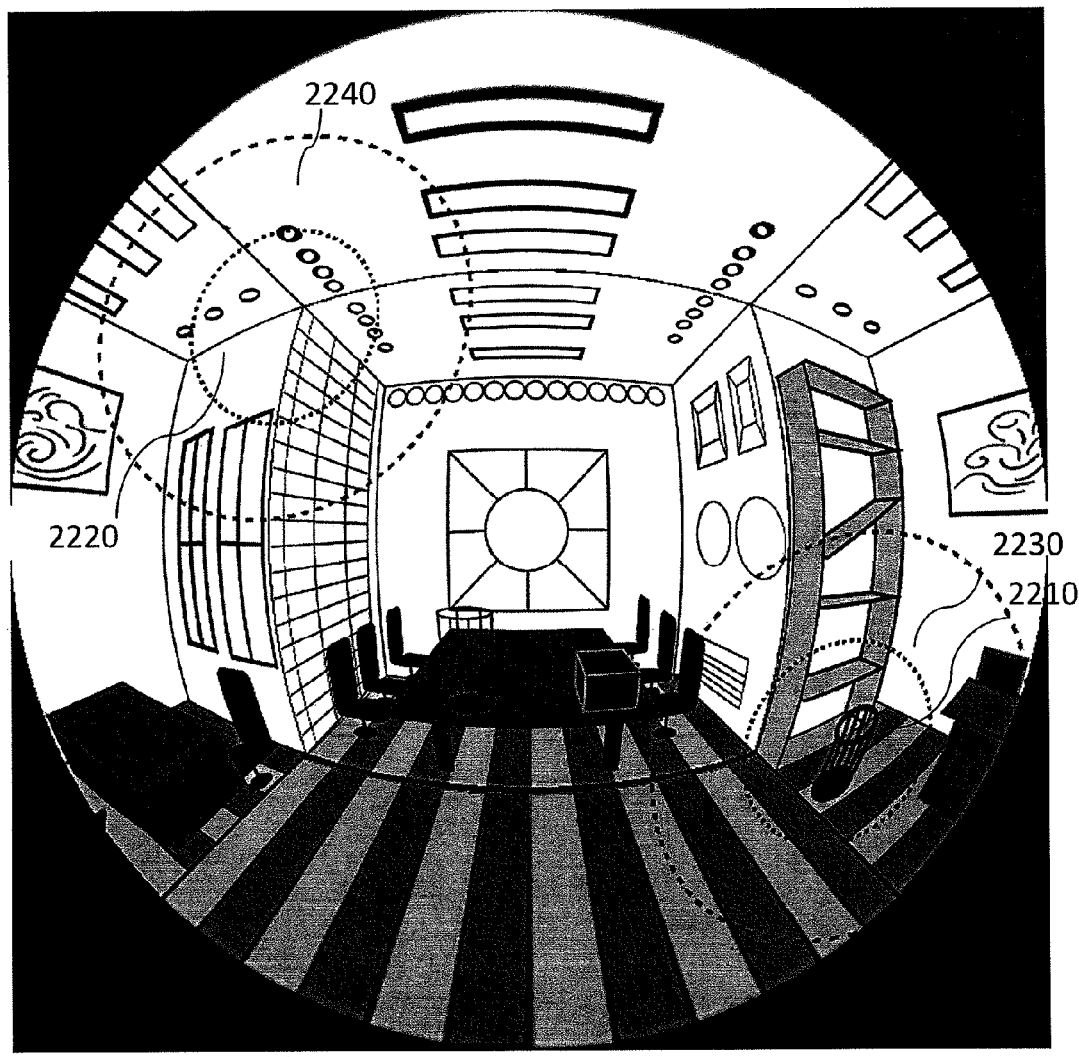
FIG. 22 is essentially the same input image as in FIG. 6 with two selected regions of interest in the image.
Figure 23:
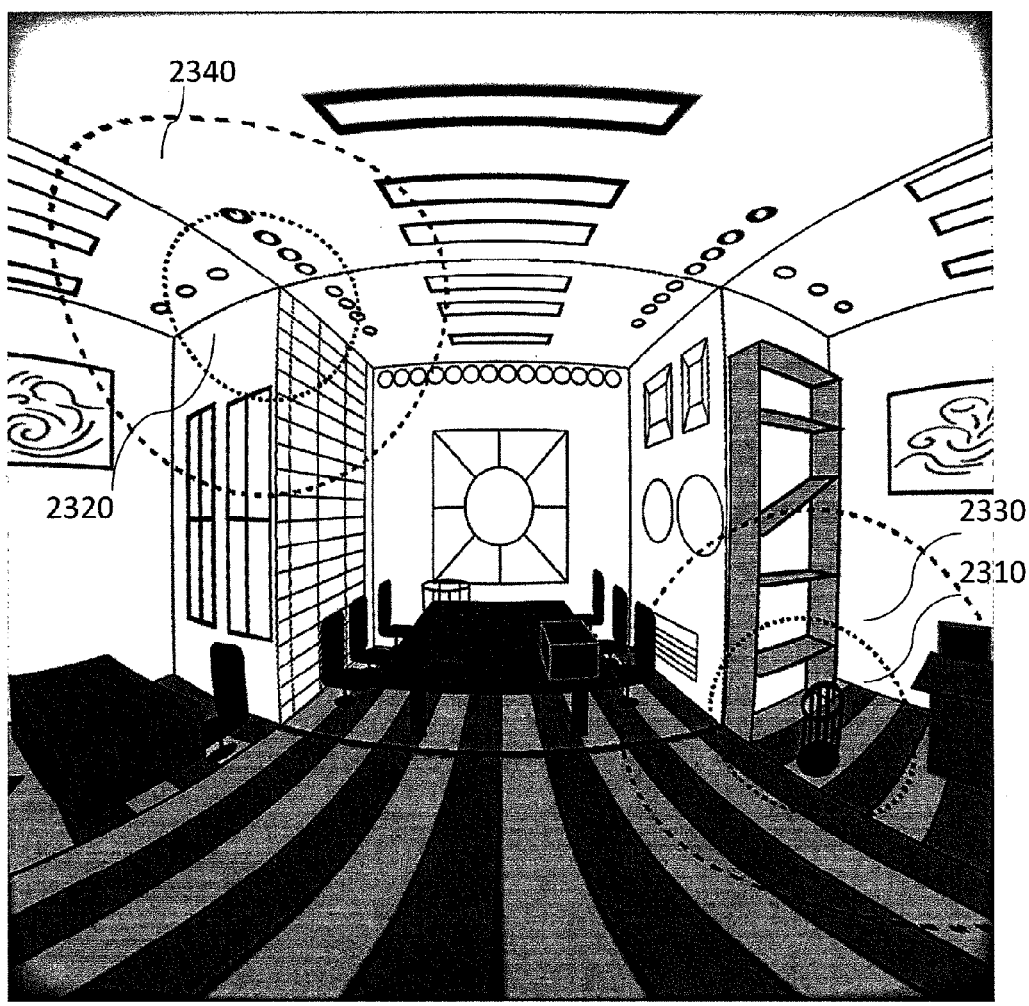
FIG. 23 illustrates the result of the zero-content-loss transformation essentially as in FIG. 17 showing two selected regions of interest.
Figure 24:
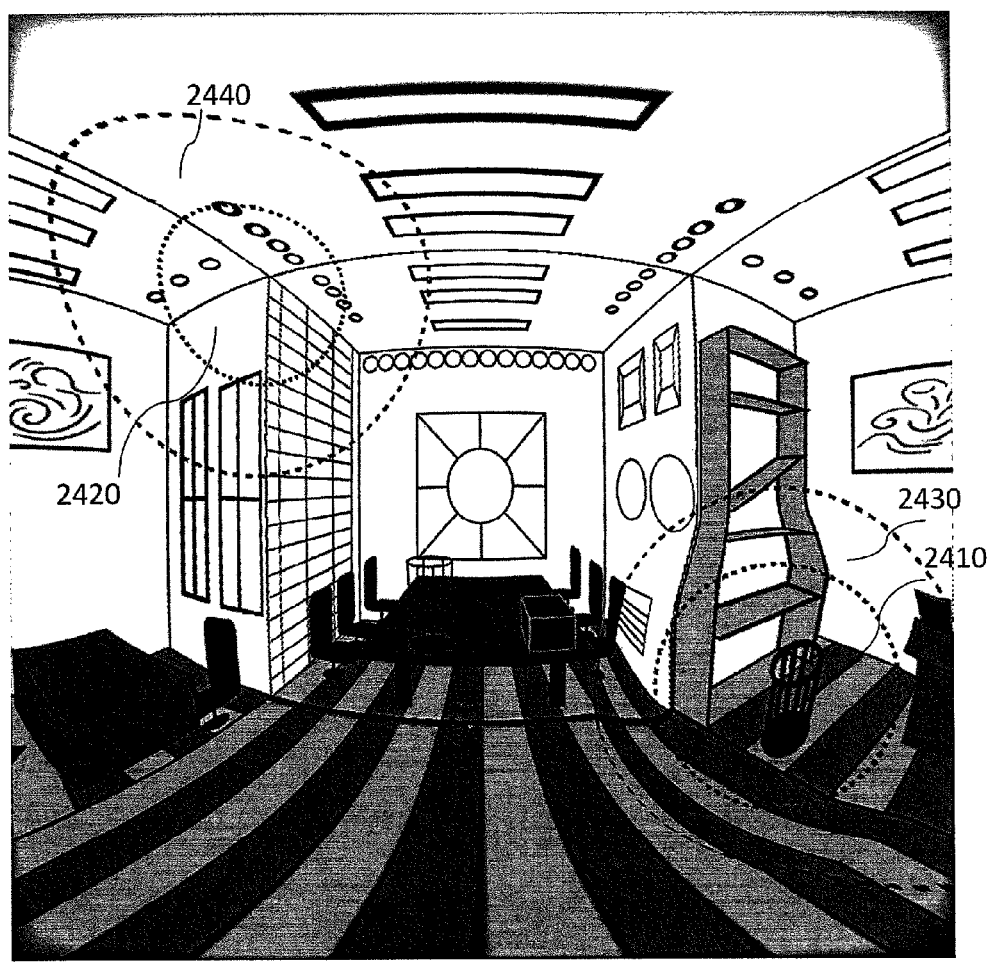
FIG. 24 illustrates the result of a local perspective transformation, within a ZCL transformation, adapted to correct the lower region of interest.
Figure 25:
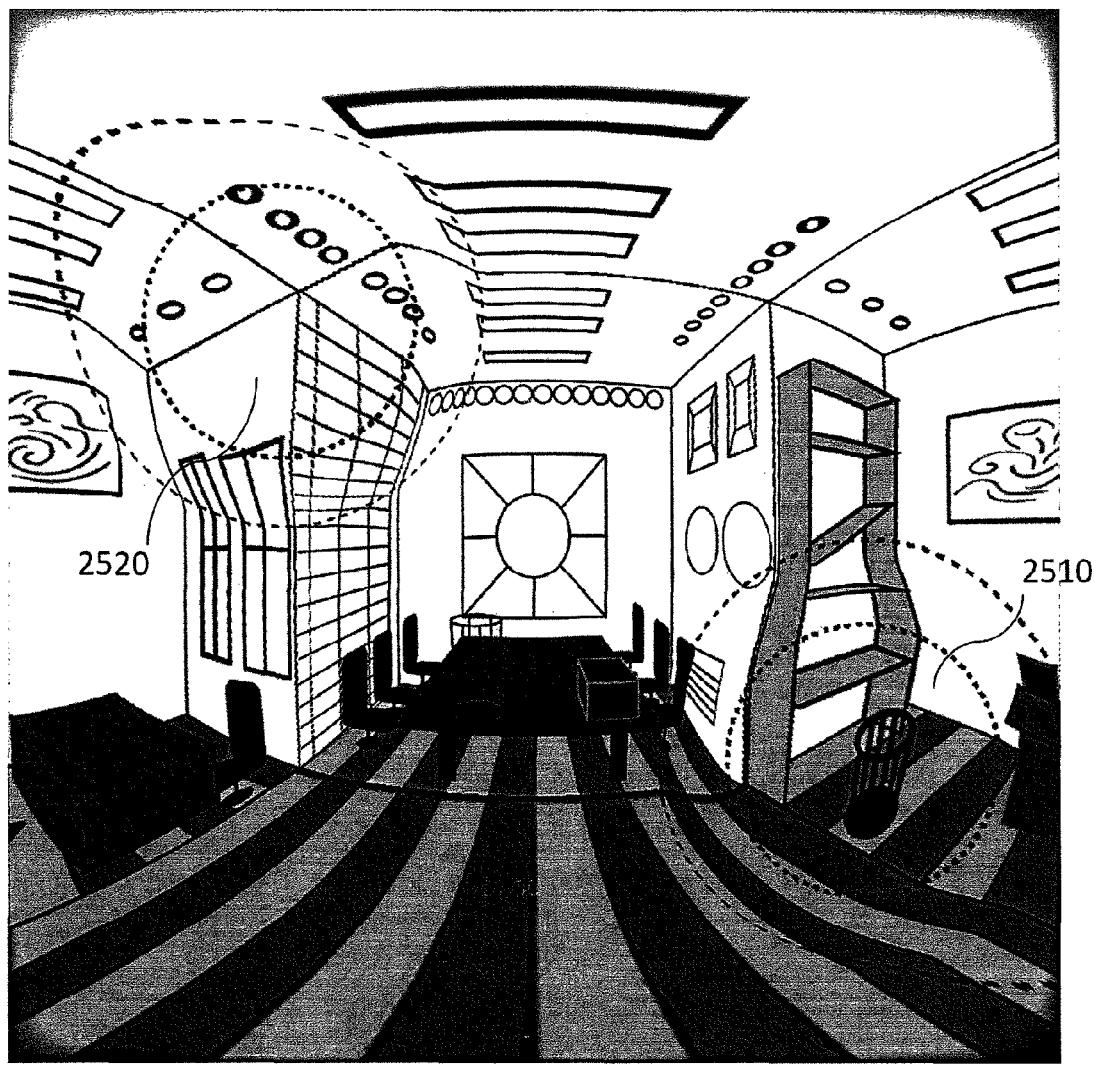
FIG. 25 illustrates the result of a local perspective transformation, within a ZCL transformation, adapted to correct the upper left region of interest, in addition to the lower right region of interest.

FIGS. 22 to 25 are discussed next to illustrate the zero-content-loss LPA correction. FIG. 22 is the UWA reference image (as in FIG. 6) with two regions of interest 2210 and 2220 within the dotted contours. Both regions correspond to a 30° conical field of view ($\theta_{pFOV}$=15°), with the 2210 at direction $(\theta_{p1},\varphi_{p1})$=(65°,−35°) and the 2220 at $(\theta_{p1},\varphi_{p1})$=(55°,140°) in this exemplary illustration. Regions 2230 and 2240 at immediate neighborhood of the regions of interest are the transition regions. In a perspective image looking in these directions, the contours would be perfect circles. As expected the UWA greatly distorts the circles into ellipse-like contours. FIG. 23 shows the reference image after applying the ZCL correction, identical to FIG. 17, but now with the regions of interest 2310 and 2320 highlighted. The full image perspective is largely improved, as previously discussed; however distortion still remains as seen in the curvature of the straight object lines. With the contours drawn, the residual distortion becomes clear. In a locally perspective correct view the contours would be circles, rather than the egg-shaped curves seen. Next the zero-content-loss LPA correction is applied to locally correct perspective for the region of interest 2310. FIG. 24 shows the results using a $z_{m1}$ value of 1; this being slightly larger than the $r_z$=0.75 value will provide a slight local zoom. The perspective is now fully corrected locally, with the contours being circles and all object lines straight within the circle. Note how the transition region 2430 has now become distorted, as if the residual distortion has been pushed out into the transition region. Away from the transition region 2430, the ZCL correction is untouched. The image within the circle 2430 is slightly rotated in order to smoothly connect with the surrounding ZCL correction. This was achieved by using $\varphi_{0p1}$=25°; by varying this angle the rotation can be changed and in turn the twisting in the transition region. The rotation does not distort the perspective correction. The image in 2410, being perspective correct, can now be analyzed for features and other video analytic processing, just like a standard camera image (this is discussed further below). At the same time being a ZCL correction, the entire scene is still available for viewing and analysis. FIG. 25 shows a similar correction applied to both regions of interest 2510 and 2520. Perspective correction is now locally achieved in both circles. Following the same procedure, multiple regions can also be corrected. Further, by varying the size of the transition region, the spreading of the distortion can be controlled.

The above examples have worked with small circular regions of interest. It is also possible to locally perspective correct large regions and use non-circular regions of interest. A useful non-circular geometry is defining rectangular regions on the output image, in which perspective correction is needed, as follows:

$(x_f,y_f) \in A_D = A_B \cup A_T \cup A_I$ $A_I = \{(x_f,y_f) \text{ such that } |x_f - x_{fp1}| \leq l_{Ix}, |y_f - y_{fp1}| \leq l_{Iy}\}$ $A_T = \{(x_f,y_f) \text{ such that } l_{Ix} < |x_f - x_{fp1}| \leq l_{Tx}, l_{Iy} < |y_f - y_{fp1}| \leq l_{Ty}\}$ $A_B = \{(x_f,y_f) \text{ such that } l_{Tx} < |x_f - x_{fp1}|, l_{Ty} < |y_f - y_{fp1}|\}$ \qquad (54)

Figure 26A:
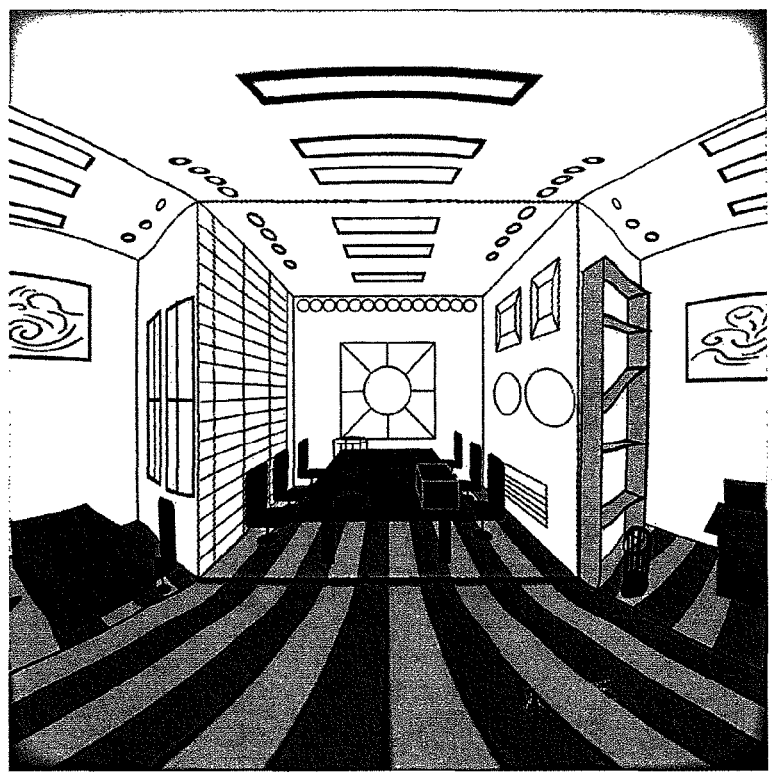
FIG. 26a illustrates an exemplary large region of interest (FOV of 90°), selected as the middle room in the image, that is corrected for perspective.
Figure 26B:
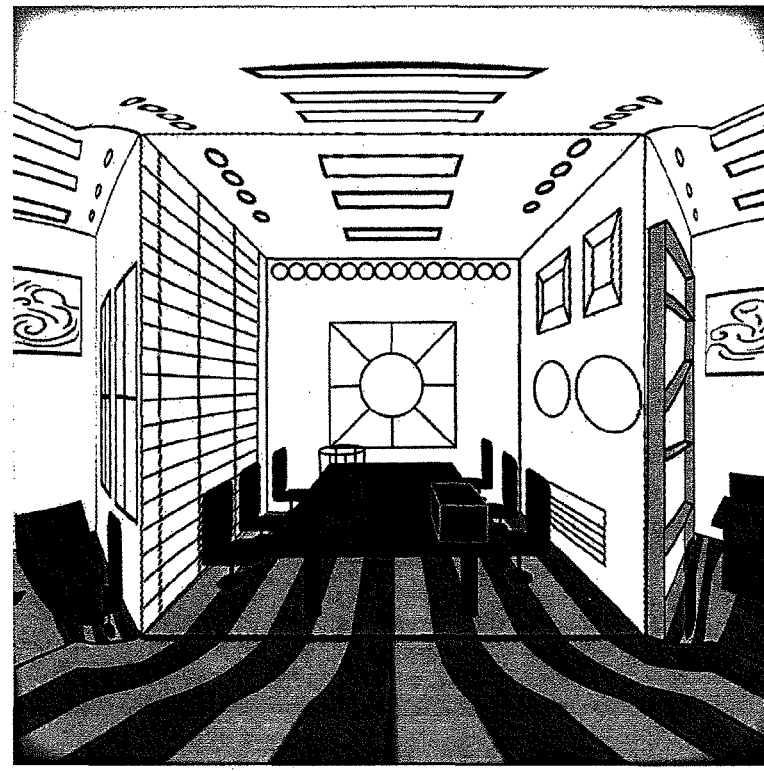
FIG. 26b illustrates the result of a local perspective transformation adapted to correct the perspective and zoom the large selected area.
Figure 26C:
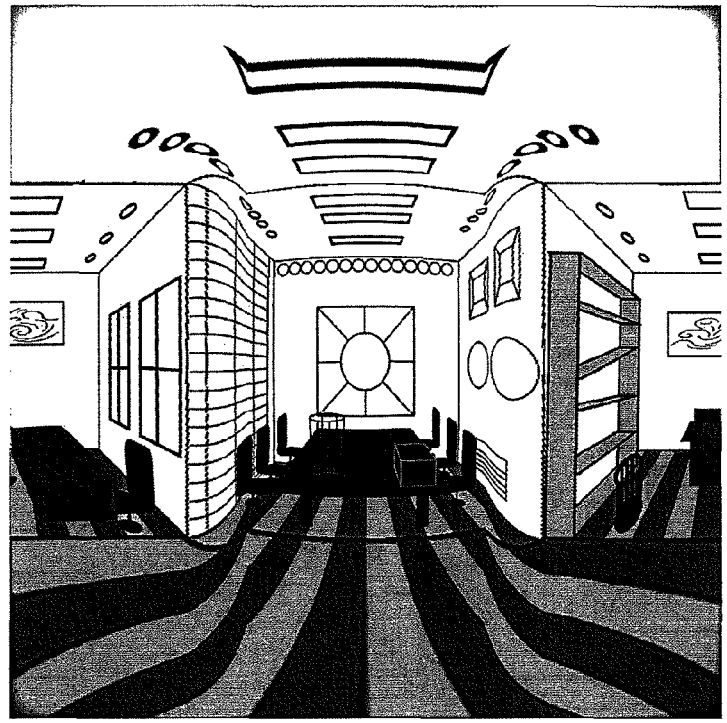
FIG. 26c illustrates the result of a local perspective transformation adapted to correct for the perspective for the two side rooms.
Figure 26D:
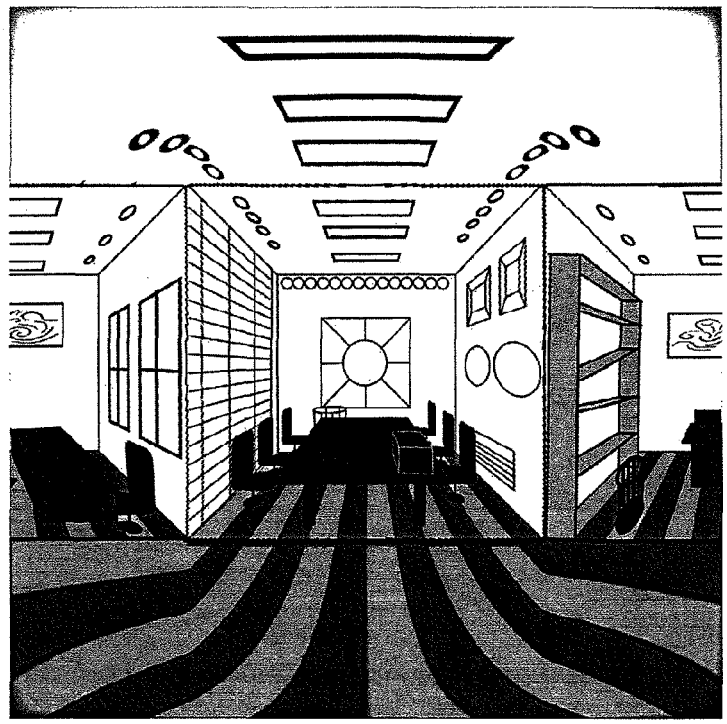
FIG. 26d illustrates the result of a combination of the two previous perspective corrected areas.

Here $\{l_{Ix}, l_{Iy}, l_{Tx}, l_{Ty}\}$ define the sizes of the rectangular regions. FIG. 26a shows a rectangular region based zero-content-loss LPA correction for a wide field of view ($\theta_{pFOV}$=45°) about the z-axis direction (directly in front of the lens). The full perspective correction of the front view within the zero-content-loss correction is seen. FIG. 26b shows the front view correction with a zoom applied. FIG. 26c shows a similar correction of the combined right view (direction $(\theta_{p1},\varphi_{p1})$=(45°,0°)) and left view (direction $(\theta_{p1},\varphi_{p1})$=(45°,180°)); here the distortions are pushed into the middle room and to the floor and ceiling. Lastly, FIG. 26d combines corrections for the left, center and right views, giving three perspective corrected regions.

Figure 27:
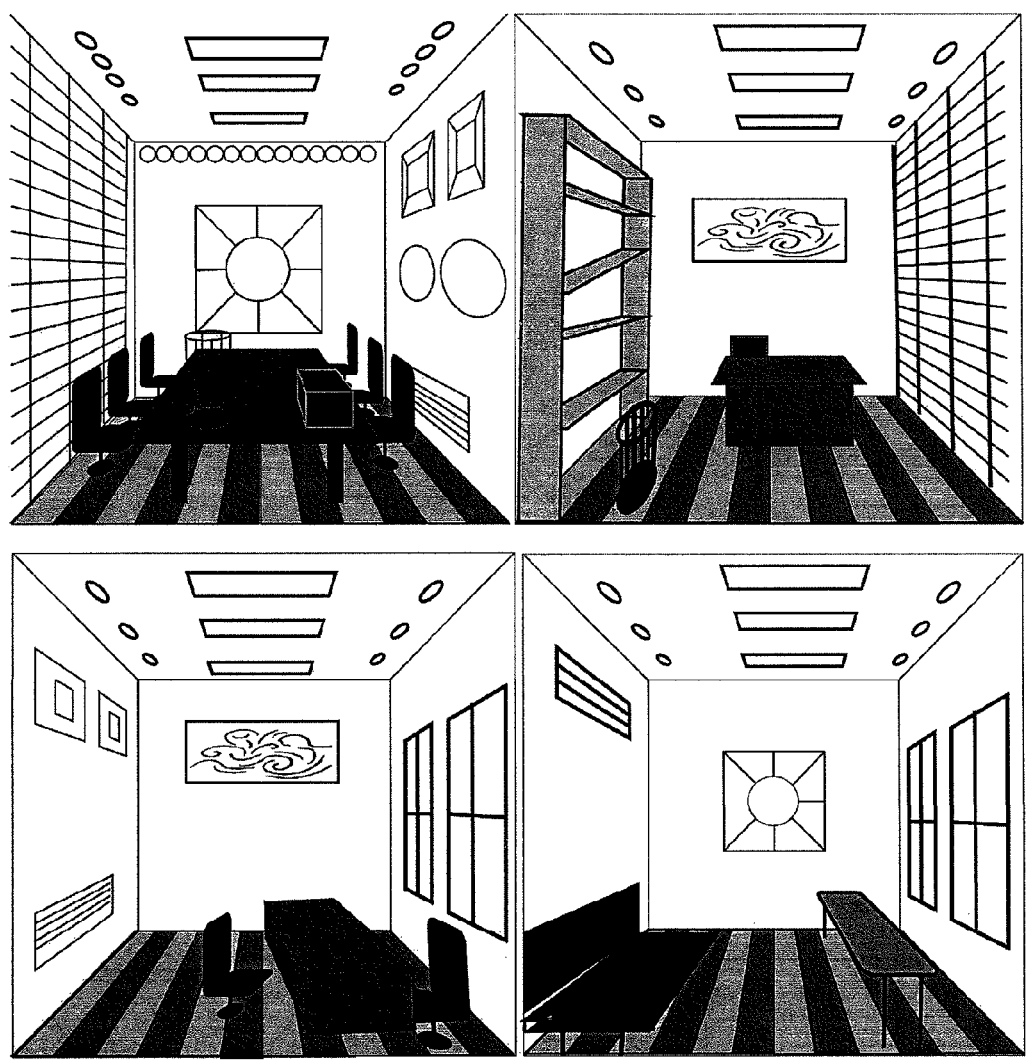
FIG. 27 illustrates the result of four locally perspective corrected rooms, each corresponding to a 90° FOV as extracted from a 360° view.

It should be noted that the above corrections being zero-content-loss, include all content from the original scene (FIG. 22). According to one embodiment, it is possible to extract only the regions of interest from the ZCL LPA correction, eliminating all other pixels in the transition and base regions, to present a set of perspective corrected views. FIG. 27 illustrates an example of such extraction wherein four rooms surrounding a 360° area (captured by e.g. two fisheyes) are individually corrected for perspective and displayed independently. Moreover, one would still be able to select smaller areas of interest in each view for further processing as disclosed before. Clearly, in this type of applications the discarded pixel information is not of great interest. An example is a video-conference setting where the faces of participants are the most important features.

Figure 28:
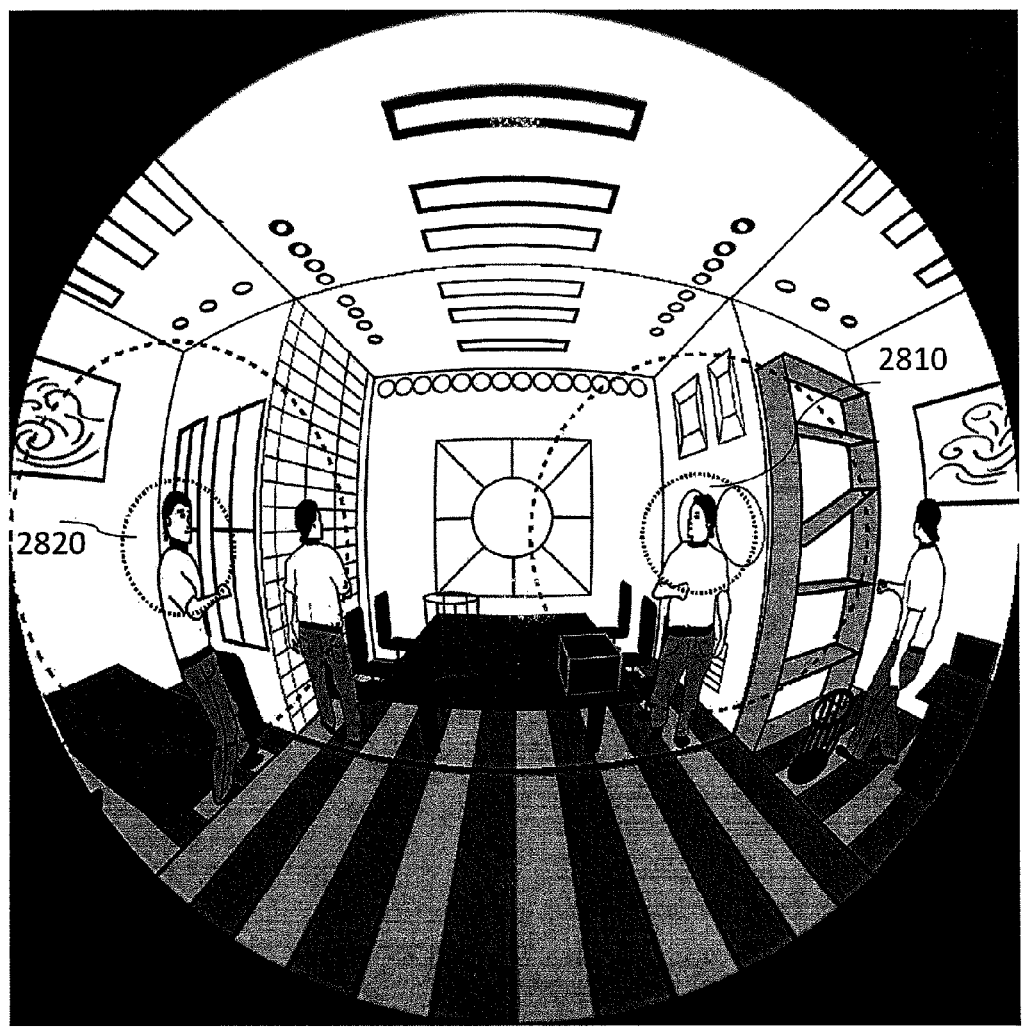
FIG. 28 illustrates an exemplary input image where areas of interested are selected in response to activity.
Figure 29:
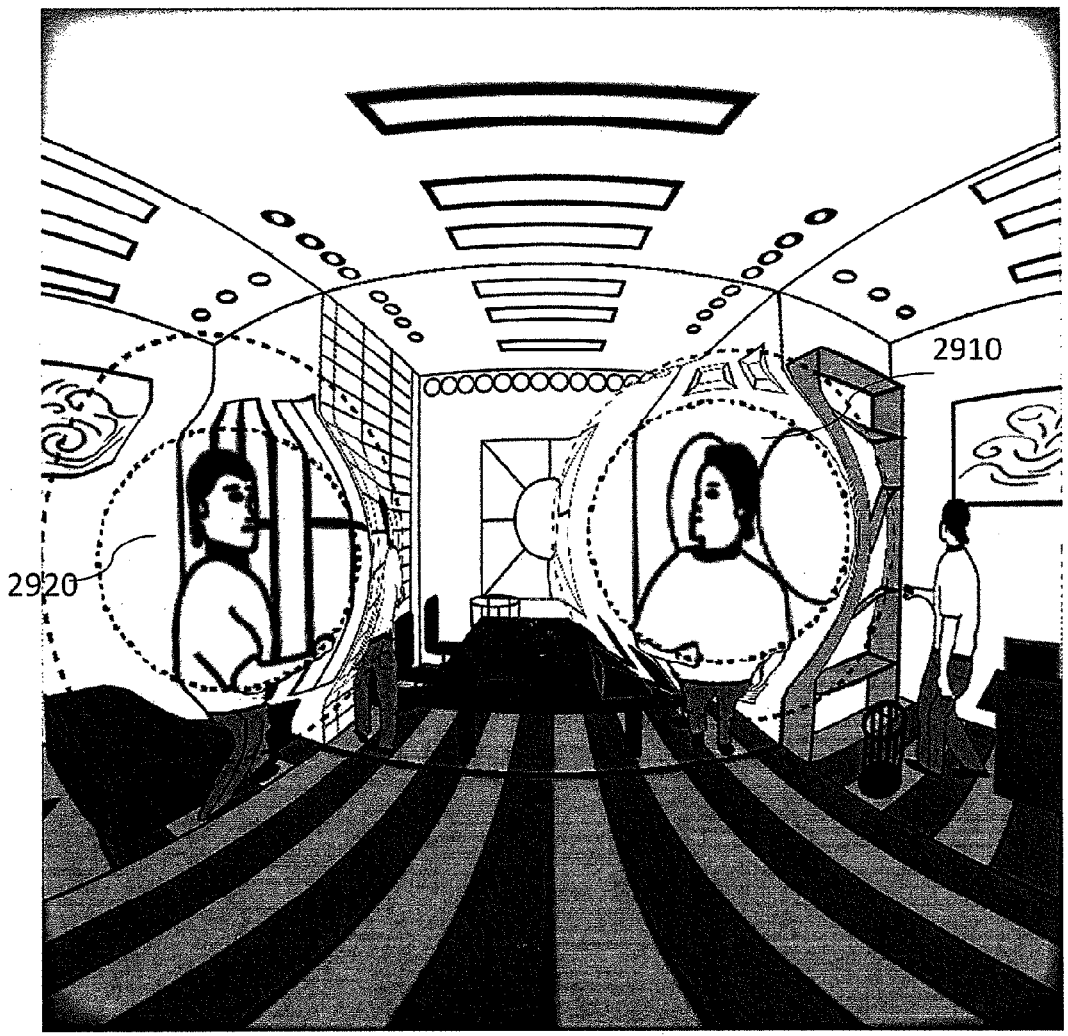
FIG. 29 illustrates the result of local perspective transformations adapted to correct for perspective (within a ZCL mapping), in addition to zoom and rotation transformations, in order to prepare the image for further video analytics.

According to another embodiment, the disclosed method is used to facilitate optional follow-up video content analysis (VCA), also known as video analytics. In order to perform object and pattern recognition in an image, or generally to analyze a video automatically; good input images are required. That means all sorts of distortions must be minimized. For instance, a video monitoring camera can be equipped with one or more of motion sensors light/sound sensors, etc. that can trigger recording events for a period of time. In that case, the content of the recorded video will be needed to recognize the moving object such as the face of a person as illustrated in FIG. 28. The embodied methods can be used to select areas of interest 2810 and 2820 around the moving object, and correct the perspective while other contents of the video and their relation to the object of interest are preserved. FIG. 29 shows how the areas of interest in the vicinity of the faces 2810 and 2820 are corrected. In this example, the faces are further zoomed in (and could be further rotated) in order to aid an image recognition means. At the same time, being a zero-content-loss map, all scene information is maintained for additional detection or analytics in parallel. This adaptive correction not only is applicable to a plurality of zones within the FOV, but can be applied also to multiple frames of a video with different time stamps. Accordingly, FIG. 29 can also be interpreted as one person at various locations under surveillance at different times.

In one preferred embodiment, the methods disclosed above are implemented in an electronic processor. The processor can be integrated to an image capture, image display or an image processing device. The disclosed methods can also be implemented as software for use in a computer-readable medium.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method for transforming a plurality of input video images captured from a scene through at least one ultra wide-angle (UWA) lens using at least one electronic processor, wherein the at least one UWA lens is characterized by a corresponding lens transformation that maps three dimensional (3D) object space onto a plane that displays the plurality of input video images, said method comprising:
   (a) obtaining the plurality of input video images data captured through the at least one UWA lens;
   (b) constructing a two dimensional (2D) surface envelope in accordance with one or more areas of the scene selected for perspective correction, wherein the 2D surface envelope fully encompasses field of view of the at least one UWA lens;
   (c) constructing an envelope transformation, independently from the corresponding UWA lens transformation, that maps an output image plane onto the 2D surface envelope uniquely for every point in the output image plane;
   (d) concatenating the corresponding UWA lens transformation for the at least one UWA lens and the envelope transformation to obtain a zero-content-loss transformation, that provides a content preserving mapping between the input and output image planes, and wherein the UWA lens transformation is independent of image content; and
   (e) applying the zero-content-loss transformation to the plurality of input video images data to obtain a plurality of output video images, wherein image perspective is accordingly transformed for the one or more selected areas of the scene;
   wherein at least one of the surface envelope and the envelope transformation is modified to locally adjust for perspective corrections in at least one region of interest; and wherein the envelope transformation is modifiable without change to the surface envelope.

2. The method of claim 1, wherein the at least one region of interest is selected manually.

3. The method of claim 1, wherein the at least one region of interest is selected automatically in response to changes in the scene.

4. The method of claim 1, wherein at least one of scaling, zoom, rotation and reflection transformation is applied to the at least one perspective corrected region of interest.

5. The method of claim 4, wherein the at least one corrected region of interest is supplied for video content analysis.

6. The method of claim 1, wherein the local perspective correction at a region of interest in a direction from the lens is obtained by:
   (i) constructing a plane envelope perpendicular to an axis connecting the lens to center of the region of interest;
   (ii) smoothly stitching the plane envelope and the surface envelope, and their transformations in the region of interest.

7. The method of claim 6, wherein local magnification is achieved by moving the plane envelope along the axis connecting the lens to the region of interest.

8. The method of claim 1, wherein the at least one UWA lens covers up to a 360° field of view.

9. The method of claim 1, wherein the lens map is provided by the lens manufacturer.

10. The method of claim 1, wherein the lens map is mathematically modeled.

11. The method of claim 1, wherein the lens map is empirically characterized.

12. The method of claim 1, wherein the surface envelope and the envelope transformation are constructed in a parameterized form.

13. The method of claim 1, wherein a cylindrical projection is used to map the output image plane to the surface envelope.

14. The method of claim 1, wherein mapping the output image plane to the surface envelope is represented as a function.

15. The method of claim 1, wherein the plurality of input video images is circular and the envelope is selected as a partial surface of a sphere, having a boundary at the field of view of the lens.

16. The method of claim 1, wherein the plurality of input video images is non-circular and the envelope is selected as a partial surface of an ellipsoid, having a boundary at a maximum field of view of the lens.

17. The method of claim 15, wherein the envelope transformation maps an output rectangular image comprising a boundary and a plurality of pixel rows, said transformation is constructed by:
   (i) mapping pixels on the output image boundary to the boundary of the ellipsoid envelope;
   (ii) mapping centers of the plurality of pixel rows to an ellipse on the ellipsoid; and
   (iii) mapping non-boundary pixels for each of the plurality of pixel rows to a curve on the ellipsoid, said curve constructed by interpolating a plane containing map of the center pixel and maps of corresponding two boundary pixels.

18. The method of claim 1, wherein the zero-content-loss output image is displayed in its entirety.

19. The method of claim 1, wherein a panoramic view is extracted from the zero-content-loss output image for display.

20. The method of claim 1, wherein a plurality of perspective corrected regions is extracted from the output image to display independently.

21. The method of claim 20, wherein at least one of scaling, zoom, rotation and reflection transformation is applied to the perspective corrected regions.

22. An electronic processor for transforming a plurality of input video images captured from a scene through at least one ultra wide-angle (UWA) lens, wherein each of the at least one UWA lens is characterized by a corresponding lens transformation that maps three dimensional (3D) object space onto a plane that displays the plurality of input video images, said processor comprising:
　(a) means to obtain the plurality of input video images data captured through the at least one UWA lens;
　(b) means to select a two dimensional (2D) surface envelope in accordance with one or more areas of the scene selected for perspective correction, wherein the 2D surface envelope fully encompasses field of view of the at least one UWA lens;
　(c) means to construct an envelope transformation, independently from the corresponding UWA lens transformation, that maps an output image plane onto the 2D surface envelope uniquely for every point in the output image plane;
　(d) means to concatenate the corresponding UWA lens transformation for the at least one UWA lens and the envelope transformation to obtain a zero-content-loss transformation that provides a content preserving mapping between the input and output image planes, and wherein the UWA lens transformation is independent of image content; and
　(e) means to apply the zero-content-loss transformation to the plurality of input video images data to obtain a plurality of output video images, wherein image perspective is accordingly transformed for the one or more selected areas of the scene;
　　wherein said processor further comprises means to modify at least one of the surface envelope and the envelope transformation to locally adjust for perspective corrections in at least one region of interest; and wherein the envelope transformation is modifiable without change to the surface envelope.

23. The processor of claim 22, wherein said processor further comprises means to enable manual selection of the at least one region of interest.

24. The processor of claim 22, wherein said processor further comprises means to enable automatic selection of the at least one region of interest in response to changes in the scene.

25. The processor of claim 22, wherein said processor further comprises means to apply at least one of scaling, zoom, rotation and reflection transformation to the at least one perspective corrected region of interest.

* * * * *